US010516276B2

(12) United States Patent
Yamauchi et al.

(10) Patent No.: US 10,516,276 B2
(45) Date of Patent: Dec. 24, 2019

(54) SECONDARY BATTERY PROTECTING INTEGRATED CIRCUIT, SECONDARY BATTERY PROTECTING CIRCUIT, CHARGE CONTROL CIRCUIT, AND BATTERY PACK

(71) Applicants: Tsutomu Yamauchi, Tokyo (JP); Iwao Kitamura, Tokyo (JP)

(72) Inventors: Tsutomu Yamauchi, Tokyo (JP); Iwao Kitamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 274 days.

(21) Appl. No.: 15/454,164

(22) Filed: Mar. 9, 2017

(65) Prior Publication Data

US 2018/0183247 A1 Jun. 28, 2018

(30) Foreign Application Priority Data

Dec. 27, 2016 (JP) .................................. 2016-252939
Feb. 16, 2017 (JP) .................................. 2017-027288

(51) Int. Cl.
*H02J 7/00* (2006.01)

(52) U.S. Cl.
CPC .......... *H02J 7/0031* (2013.01); *H02J 7/0029* (2013.01); *H02J 2007/004* (2013.01); *H02J 2007/0037* (2013.01); *H02J 2007/0039* (2013.01)

(58) Field of Classification Search
CPC .................................................... H02J 7/0031
(Continued)

(56) References Cited

U.S. PATENT DOCUMENTS 6,104,165 A 8/2000 Miyamoto et al.
7,598,708 B2 * 10/2009 Kimura ................. H02J 7/0031
320/132

(Continued)

FOREIGN PATENT DOCUMENTS

JP H10-290531 10/1998
JP H11-097074 4/1999

(Continued)

OTHER PUBLICATIONS

Japanese Office Action for 2017-027288 dated May 16, 2017.
Japanese Office Action for 2016-252939 dated Jun. 13, 2017.
Japanese Office Action for 2017-027288 dated Aug. 1, 2017.

*Primary Examiner* — Jerry D Robbins
(74) *Attorney, Agent, or Firm* — IPUSA, PLLC

(57) ABSTRACT

A secondary battery protecting integrated circuit protects a secondary battery by controlling a switch circuit inserted in series on a path connected to a first electrode of the secondary battery. The secondary battery protecting integrated circuit includes: a sense terminal connected to a monitor terminal provided so that a first electric potential of the first electrode is monitorable; a first power supply terminal connected to the path; a second power supply terminal connected to a second electrode of the secondary battery; an internal wiring line configured to connect the first power supply terminal and the sense terminal; an internal switch on the internal wiring line; an abnormality detecting circuit configured to detect a predetermined abnormality; and a switch control circuit configured to turn on the internal switch when the predetermined abnormality is not detected, and configured to turn off the internal switch when the predetermined abnormality is detected.

6 Claims, 19 Drawing Sheets

(58) Field of Classification Search
USPC .......................................................... 320/134
See application file for complete search history.

(56) References Cited

U.S. PATENT DOCUMENTS

| | | | |
|---|---|---|---|
| 2003/0193318 A1 | 10/2003 | Ozawa et al. | |
| 2004/0232889 A1* | 11/2004 | Sudo | H02J 7/0031 320/149 |
| 2005/0120251 A1* | 6/2005 | Fukumori | G06F 1/30 713/300 |
| 2013/0193924 A1* | 8/2013 | Kurokawa | H02J 7/0029 320/112 |
| 2016/0093921 A1* | 3/2016 | Kadirvel | G01R 31/382 320/112 |

FOREIGN PATENT DOCUMENTS

| | | |
|---|---|---|
| JP | 2003-307555 | 10/2003 |
| JP | 2006-351384 | 12/2006 |
| JP | 2007-052968 | 3/2007 |
| JP | 2010-288377 | 12/2010 |
| JP | 2013-153614 | 8/2013 |

\* cited by examiner

FIG.9

|  | DISCHARGE CONTROL TRANSISTOR | CHARGE CONTROL TRANSISTOR | TERMINAL P− | INTERNAL SWITCH | TERMINAL BS− |
|---|---|---|---|---|---|
| NORMAL STATE | ON | ON | − | ON | B− |
| OVP (OVERCHARGING) | ON | OFF | Hi-Z | OFF | BS-VM SHORT |
| UVP (OVER-DISCHARGING) | OFF | ON | Pull-up | OFF | BS-VM SHORT |
| DOC (DISCHARGE-OVERCURRENT) | OFF | ON | Pull-Down | OFF | BS-VM SHORT |
| COC (CHARGE-OVERCURRENT) | ON | OFF | Hi-Z | OFF | BS-VM SHORT |

FIG.10

|  | DISCHARGE CONTROL TRANSISTOR | CHARGE CONTROL TRANSISTOR | TERMINAL P− | INTERNAL SWITCH | TERMINAL BS− |
|---|---|---|---|---|---|
| NORMAL STATE | ON | ON | − | ON | B− |
| OVP (OVERCHARGING) | ON | OFF | Hi-Z | OFF | Hi-Z |
| UVP (OVER-DISCHARGING) | OFF | ON | Pull-up | OFF | Pull-up |
| DOC (DISCHARGE-OVERCURRENT) | OFF | ON | Pull-Down | OFF | Pull-Down |
| COC (CHARGE-OVERCURRENT) | ON | OFF | Hi-Z | OFF | Hi-Z |

FIG.11

| | STATE OF CHARGER | DISCHARGE CONTROL TRANSISTOR | CHARGE CONTROL TRANSISTOR | TERMINAL P− | INTERNAL SWITCH | TERMINAL BS− |
|---|---|---|---|---|---|---|
| NORMAL STATE | − | ON | ON | − | ON | B− |
| OVP (OVERCHARGING) | − | ON | OFF | Hi-Z | OFF | BS-VM SHORT |
| UVP (OVER-DISCHARGING) | CHARGER IS NOT CONNECTED | OFF | ON | Pull-up | OFF | BS-VM SHORT |
| | CHARGER IS CONNECTED | | | | ON | B− |
| DOC (DISCHARGE-OVERCURRENT) | − | OFF | ON | Pull-Down | OFF | BS-VM SHORT |
| COC (CHARGE-OVERCURRENT) | − | ON | OFF | Hi-Z | OFF | BS-VM SHORT |

SECONDARY BATTERY PROTECTING INTEGRATED CIRCUIT, SECONDARY BATTERY PROTECTING CIRCUIT, CHARGE CONTROL CIRCUIT, AND BATTERY PACK

CROSS-REFERENCE TO RELATED APPLICATIONS

This patent application is based upon and claims the benefit of priority of Japanese Patent Application No. 2016-252939 filed on Dec. 27, 2016 and Japanese Patent Application No. 2017-027288 filed on Feb. 16, 2017, the entire contents of which are incorporated herein by reference.

BACKGROUND OF THE INVENTION

1. Field of the Invention

The present disclosure relates to a secondary battery protecting integrated circuit, a secondary battery protecting circuit, a charge control circuit, and a battery pack.

2. Description of the Related Art

FIG. 1 is a diagram illustrating an example of a configuration of a conventional battery protecting apparatus 901. The battery protecting apparatus 901 illustrated in FIG. 1 includes a protecting Integrated Circuit (IC) that protects a secondary battery 900. The protecting IC 920 protects the secondary battery 900 from a charge abnormality by turning off a charge control transistor 911, and protects the secondary battery 900 from a discharge abnormality by turning off a discharge control transistor 912.

The charging IC 930 monitors a terminal voltage Vba between a terminal 913 and a terminal 914 in order to detect a battery voltage Vce of the secondary battery 900. The charging IC 930 switches a method of charging the secondary battery 900 in accordance with a value of the terminal voltage Vba.

Patent Documents 1, 2, and 3 disclose charging methods of secondary batteries.

FIG. 2 is a diagram illustrating an example of a conventional method of charging the secondary battery. The charging method illustrated in FIG. 2 is described with reference to FIG. 1. Until the terminal voltage Vba reaches a predetermined charging voltage, the charging IC 930 performs constant current charging (CC charging) by charging the secondary battery 900 with a relatively large constant current. Subsequently, after the terminal voltage Vba reaches the predetermined charging voltage, the charging IC 930 performs constant voltage charging (CV charging) by charging the secondary battery 900 with a relatively small current.

However, the terminal voltage Vba becomes higher than the actual battery voltage Vce because a voltage drop ΔV due to ON resistance of transistors 911 and 912 that are present between the charging IC 930 and the secondary battery 900. As described above, because the charging IC 930 cannot accurately detect the battery voltage Vce, as illustrated in FIG. 2, the charging method is switched from the CC charging to the CV charging before the battery voltage Vce reaches the predetermined charging voltage. Accordingly, a time period of performing the CC charging with the relatively large current becomes shorter, and a time period of performing the CV charging with relatively small current from a time point, at which the terminal voltage Vba reaches the predetermined voltage, to a time point, at which the battery voltage Vce reaches the predetermined voltage becomes longer. As a result, a charging time for the battery voltage Vce to reach the predetermined charging voltage becomes long as a whole.

RELATED ART DOCUMENT

Patent Document

[Patent Document 1]: Japanese Laid-open Patent Publication No. 2007-052968
[Patent Document 2]: Japanese Laid-open Patent Publication No. H11-097074
[Patent Document 3]: Japanese Laid-open Patent Publication No. H10-290531

SUMMARY OF THE INVENTION

An object of the present disclosure is to provide a secondary battery protecting integrated circuit and a secondary battery protecting circuit that enable an external circuit to accurately detect a battery voltage of a secondary battery.

Another object of the present disclosure is to provide a charge control circuit and a battery pack that can accurately detect a battery voltage of a secondary battery.

According to one aspect of the present disclosure, there is provided a secondary battery protecting integrated circuit for protecting a secondary battery by controlling a switch circuit inserted in series on a path that is connected to a first electrode of the secondary battery. The secondary battery protecting integrated circuit includes: a sense terminal connected to a monitor terminal provided so that a first electric potential of the first electrode is monitorable; a first power supply terminal connected to the path between the first electrode and the switch circuit; a second power supply terminal connected to a second electrode of the secondary battery; an internal wiring line configured to connect the first power supply terminal and the sense terminal; an internal switch inserted in series on the internal wiring line; an abnormality detecting circuit configured to detect a predetermined abnormality; and a switch control circuit configured to turn on the internal switch when the predetermined abnormality is not detected by the abnormality detecting circuit, and configured to turn off the internal switch when the predetermined abnormality is detected by the abnormality detecting circuit.

According to one aspect of the present disclosure, there is provided a secondary battery protecting circuit for protecting a secondary battery by controlling a switch circuit inserted in series on a path that is connected to a first electrode of the secondary battery. The secondary battery protecting circuit includes: a terminal provided so that a first electric potential of the first electrode is monitorable; a wiring line configured to connect the terminal and the path between the first electrode and the switch circuit; a switch inserted in series on the wiring line; an abnormality detecting circuit configured to detect a predetermined abnormality; and a switch control circuit configured to turn on the switch when the predetermined abnormality is not detected by the abnormality detecting circuit, and configured to turn off the switch when the predetermined abnormality is detected by the abnormality detecting circuit.

According to one aspect of the present disclosure, there is provided a charge control circuit for controlling, from outside a battery pack, charging of a secondary battery that is built in the battery pack based on a first electric potential of a first electrode of the secondary battery and on a second electric potential of a second electrode of the secondary battery. A secondary battery protecting integrated circuit, configured to protect the secondary battery by controlling a switch circuit inserted in series on a path that is connected to the first electrode of the secondary battery, is built in the battery pack. The charge control circuit includes a voltage detecting circuit including a monitor part configured to monitor the first electric potential of the first electrode and the second electric potential of the second electrode of the secondary battery, a first power supply terminal connected to the first electrode via the switch circuit, and a second power supply terminal connected to the second electrode; a switch disposed between the first electrode and the monitor part; a diode disposed between the power supply terminal and a point between the switch and the monitor part; and a protection state detecting part configured to turn off the switch when a state, in which the secondary battery protecting integrated circuit protects the secondary battery, is detected.

According to one aspect of the present disclosure, there is provided a battery pack, in which a secondary battery and a secondary battery protecting integrated circuit configured to protect the secondary battery are built. Charging of the secondary battery is controlled based on an electric potential of an electrode of the secondary battery. The battery pack includes: a potential output terminal configured to output, to outside the battery pack, the potential of the electrode; a switch disposed between the electrode and the potential output terminal; and a protection state detecting part configured to turn off the switch when a state, in which the secondary battery protecting integrated circuit protects the secondary battery, is detected.

BRIEF DESCRIPTION OF THE DRAWINGS

FIG. 9 is a table illustrating a first example of switch control and terminal processing in each state;

FIG. 10 is a table illustrating a second example of switch control and terminal processing in each state;

FIG. 11 is a table illustrating a third example of switch control and terminal processing in each state;

DETAILED DESCRIPTION OF THE PREFERRED EMBODIMENTS

In the following, embodiments of the present disclosure will be described with reference to the drawings.

First Embodiment

Figure 1:
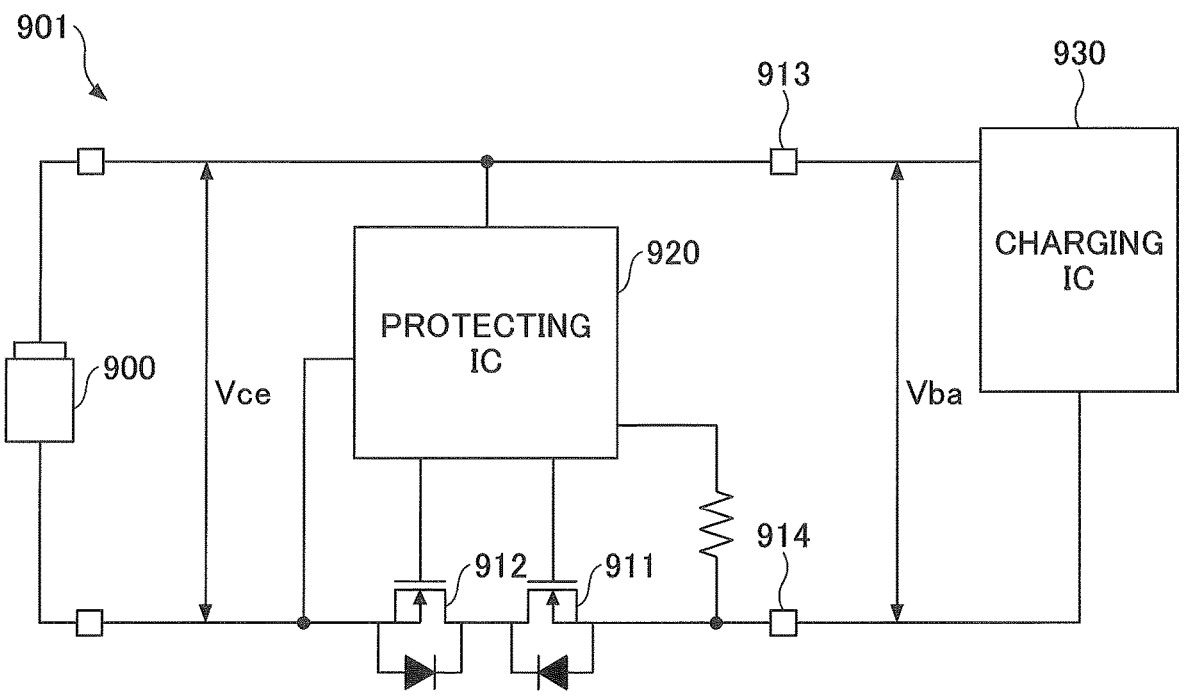
FIG. 1 is a diagram illustrating ax example of a configuration of a conventional battery protecting apparatus.
Figure 2:
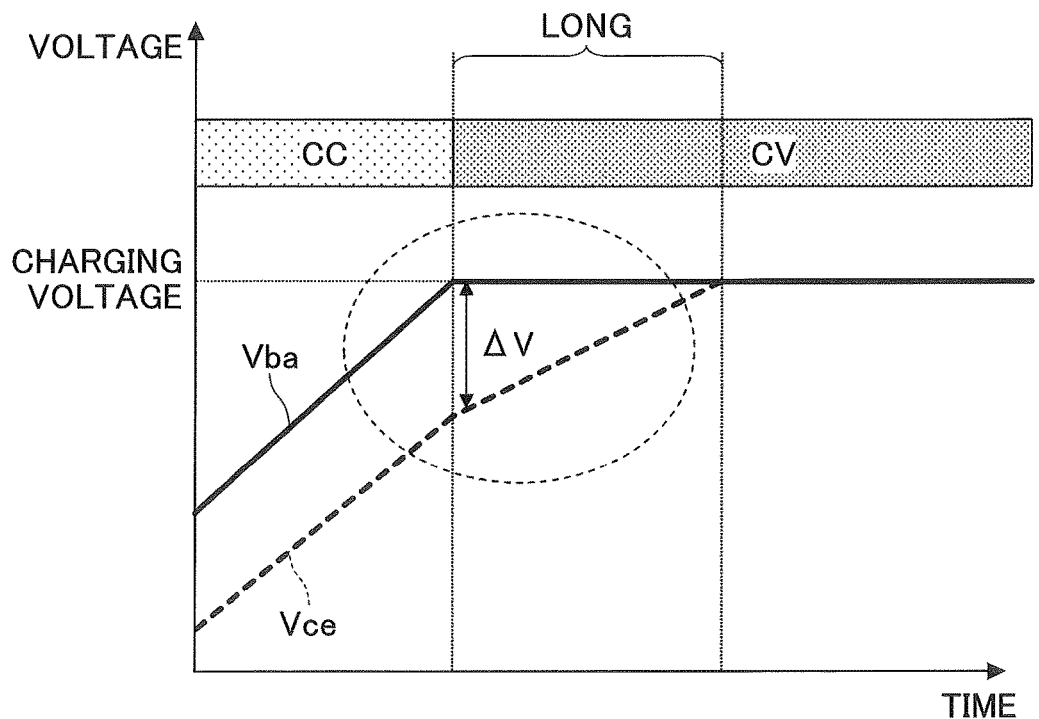
FIG. 2 is a diagram illustrating an example of a conventional method of charging a secondary battery.
Figure 3:
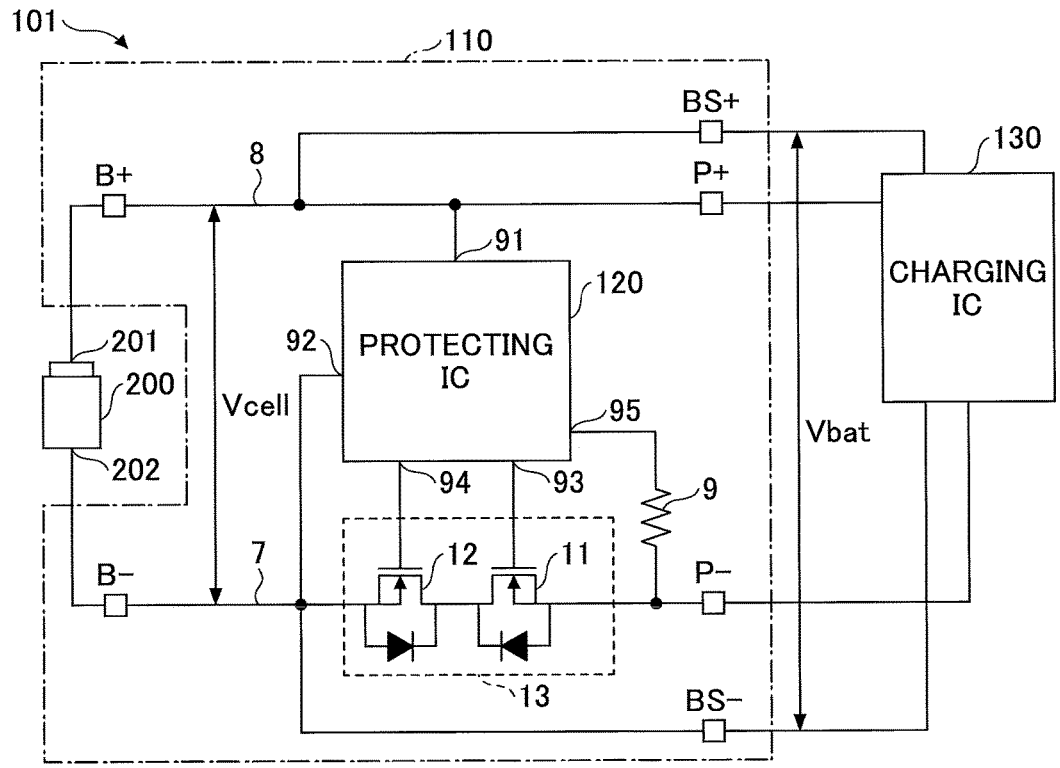
FIG. 3 is a diagram illustrating an example of a configuration of a battery protecting apparatus according to a first embodiment.

FIG. 3 is a diagram illustrating an example of a configuration of a battery protecting apparatus 101 according to a first embodiment. The battery protecting apparatus 101 illustrated in FIG. 3 is an example of a battery protecting apparatus that protects a secondary battery 200.

The secondary battery 200 is an example of a chargeable battery. A lithium ion battery, a lithium polymer battery, etc., are specific examples of the secondary battery 200.

The battery protecting apparatus 101 is powered by the secondary battery 200, and controls charging/discharging (charge/discharge operation) of the secondary battery 200 to protect the secondary battery 200 from over discharging, and the like. The battery protecting apparatus 101 includes a substrate, a switch circuit 13, a protecting integrated circuit (IC) 120, and a resistor 9.

The switch circuit 13, the protecting IC 120, and the resistor 9 are mounted on the substrate 110. A specific example of the substrate 110 is a printed substrate. A terminal B+, a terminal B−, a terminal P+, a terminal P−, a terminal BS+, and a terminal BS− are provided on the substrate 110. For example, each of the terminals is an electrode formed on the substrate 110.

The terminal B+ is an example of a battery positive side terminal, and is connected to a positive electrode 201 of the secondary battery 200. The terminal B− is an example of a battery negative side terminal, and is connected to a negative electrode 202 of the secondary battery 200. The terminal P+ is an example of a load positive side terminal, and is connected to a positive terminal of a charge integrated circuit (IC) 130. The charging IC 130 is a part of a load. The terminal P− is an example of a load negative side terminal, and is connected to a negative terminal of the charging IC 130. The terminal BS+ is an example of a positive side monitor terminal provided so that an electric potential of the positive electrode 201 of the secondary battery 200 can be monitored. The terminal BS+ is connected to a positive side monitor terminal of the charging IC 130. The terminal BS− is an example of a negative side monitor terminal provided so that an electric potential of the negative electrode 202 of the secondary battery 200 can be monitored. The terminal BS− is connected to a negative side monitor terminal of the charging IC 130. The charging IC 130 is an example of an external circuit that detects a battery voltage of the secondary battery 200.

The terminal B+ and the terminal P+ are connected through a positive side power supply path 8. The terminal B− and the terminal P− are connected through a negative side power supply path 7. The positive side power supply path 8 is an example of a charging/discharging current path between the terminal B+ and the terminal P+. The negative side power supply path 7 is an example a charging/discharging current path between the terminal B− and the terminal P−.

The switch circuit 13 is inserted in series on the negative side power supply path 7 between the terminal B− and the terminal P−. For example, the switch circuit 13 is a series circuit in which a charge control transistor 11 and a discharge control transistor 12 are connected in series. When the charge control transistor 11 is turned off, the negative side power supply path 7, through which a charging current to the secondary battery 200 flows, is shut off, and the charging current flow to the secondary battery 200 is prohibited (prevented). When the discharge control transistor 12 is turned off, the negative side power supply path 7, through which a discharging current from the secondary battery 200 flows, is shut off, and the discharging current flow from the secondary battery 200 is prohibited (prevented).

For example, each of the charge control transistor 11 and the discharge control transistor 12 is an n-channel Metal Oxide Semiconductor Field Effect Transistor (MOSFET). The charge control transistor 11 is inserted in the negative side power supply path 7 such that a forward direction of a parasitic diode of the charge control transistor 11 matches a direction in which the discharging current from the secondary battery 200 flows. The discharge control transistor 12 is inserted in the negative side power supply path 7 such that a forward direction of a parasitic diode of the discharge control transistor 12 matches a direction in which the charging current to the secondary battery 200 flows.

The protecting IC 120 is an example of a battery protecting integrated circuit. The protecting IC 120 is powered by the secondary battery 200. The protecting IC 120 protects the secondary battery 200 from over discharging, etc., by controlling the switch circuit 13. For example, the protecting IC 120 turns off the charge control transistor 11 to protect the secondary battery 200 from a charge abnormality such as overcharging and an overcurrent in the charging direction (a charge overcurrent), for example. Also, the protecting IC 120 turns off the discharge control transistor 12 to protect the secondary battery 200 from a discharge abnormality such as over discharging and an overcurrent in the discharging direction (a discharge overcurrent), for example.

For example, the protecting IC 120 includes a power supply terminal 91, a ground terminal 92, a charge control terminal 93, a discharge control terminal 94, and a monitoring terminal 95. These terminals are external connection terminals for connecting one or more internal circuits of the protecting IC 120 to outside the protecting IC 120 such as an external circuit.

The power supply terminal 91 is an example of a positive side power supply terminal connected to the positive side power supply path 8. The power supply terminal 91 is connected to the positive electrode 201 of the secondary battery 200 via the terminal B+. The power supply terminal 91 may be referred to as a power supply terminal VDD.

The ground terminal 92 is an example of a negative side power supply terminal connected to the negative side power supply path 7 between the negative electrode 202 and the switch circuit 13. The ground terminal 92 is connected to the negative electrode 202 of the secondary battery 200 via the terminal B−. The ground terminal 92 may be referred to as a ground terminal VSS.

The charge control terminal 93 is an example of a charge control terminal that outputs a signal to prohibit (prevent) charging of the secondary battery 200. The charge control terminal 93 is connected to a control electrode (e.g., gate in case of MOSFET) of the charge control transistor 11. The charge control terminal 93 may be referred to as a COUT terminal.

The discharge control terminal 94 is an example of a discharge control terminal that outputs a signal to prohibit (prevent) discharging of the secondary battery 200. The discharge control terminal 94 is connected to a control electrode (e.g., gate in case of MOSFET) of the discharge control transistor 12. The discharge control terminal 94 may be referred to as a DOUT terminal.

The monitoring terminal 95 is an example of a monitoring terminal that monitors an electric potential of the terminal P−. The monitoring terminal 95 is connected to the negative side power supply path 7 between the terminal P− and the switch circuit 13. The monitoring terminal 95 is connected to the terminal P− via the resistor 9. The monitoring terminal 95 may be referred to as a monitoring terminal VM.

The battery protecting apparatus 101 includes the terminal BS+ and the terminal BS−. The terminal BS+ is connected to the positive electrode 201 of the secondary battery 200. The terminal BS− is connected to the negative electrode 202 of the secondary battery 200. Accordingly, the charging IC 130 can detect a battery voltage Vcell of the secondary battery 200 by monitoring a terminal voltage Vbat between the terminal BS+ and the terminal BS−.

An electric current that flows through the terminal BS+ for monitoring the electric potential of the positive electrode 201 is minute in comparison with a charging/discharging current of the secondary battery 200 that flows through the terminal P+. Similarly, an electric current that flows through the terminal BS− for monitoring the electric potential of the negative electrode 202 is minute in comparison with a charging/discharging current of the secondary battery 200 that flows through the terminal P− and the switch circuit 13. Hence, the terminal voltage Vbat is substantially equal to the battery voltage Vcell because a voltage drop resistance of the switch circuit 13 and the like are not present. Accordingly, the charging IC 130 can accurately detect the battery voltage Vcell by monitoring the terminal voltage Vbat between the terminal BS+ and the terminal BS−.

Figure 4:
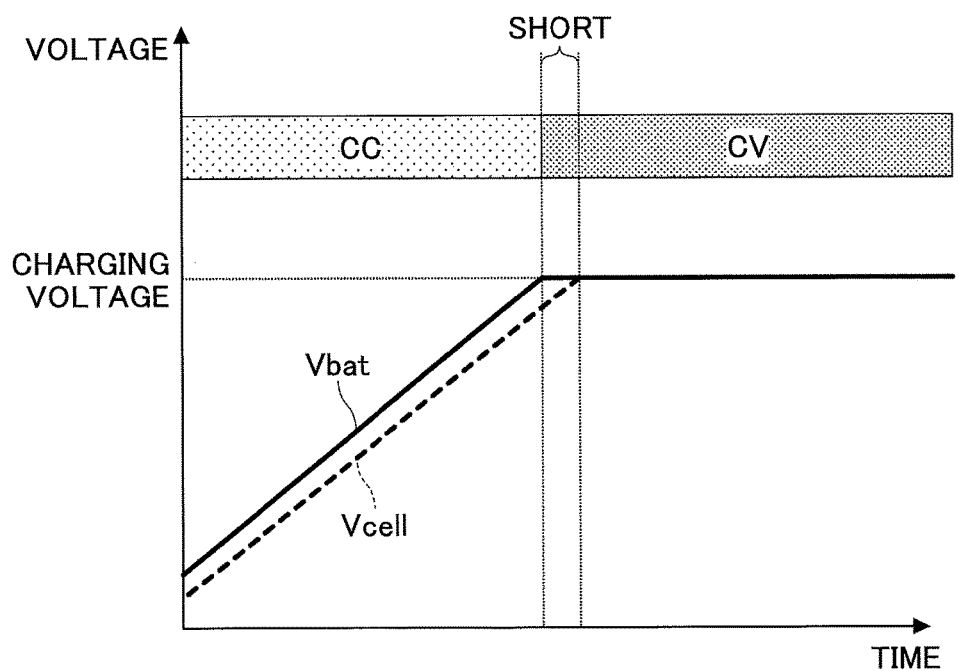
FIG. 4 is a diagram illustrating an example of a method of charging a secondary battery.

FIG. 4 is a diagram illustrating an example of a method of charging the secondary battery 200. The charging method illustrated in FIG. 4 will be described with reference to FIG.

3. Until the terminal voltage Vbat reaches a predetermined charging voltage, the charging IC 130 performs constant current charging (CC charging) by charging the secondary battery 200 with a relatively large constant current. After the terminal voltage Vbat reaches the predetermined charging voltage, the charging IC 130 performs constant voltage charging (CV charging) by charging the secondary battery 200 with relatively small current.

As described above, the terminal voltage Vbat is substantially equal to the battery voltage Vcell. Thus, a time period of performing the CC charging with the relatively large current becomes longer, and a time period of performing the CV charging with relatively small current from a time point, at which the terminal voltage Vbat reaches the predetermined voltage, to a time point, at which the battery voltage Vcell reaches the predetermined voltage becomes shorter. Accordingly, it is possible to shorten a charging time for the battery voltage Vcell to reach the predetermined charging voltage as a whole.

Next, cases will be described in which leakage resistance is generated between terminals.

Figure 5:
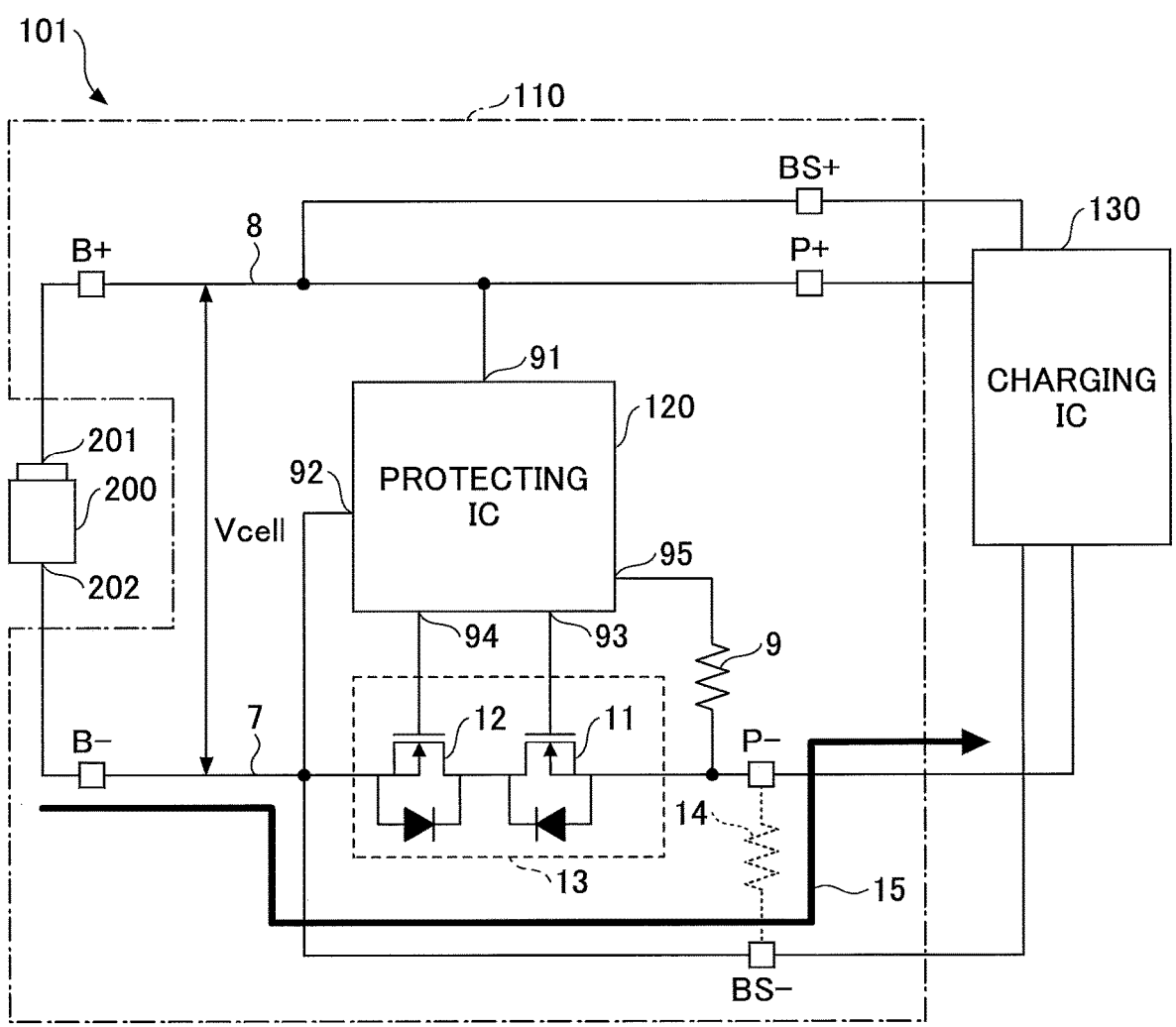
FIG. 5 is a diagram illustrating a case in which a leakage resistance is generated between a terminal P− and a terminal BS−.

FIG. 5 is a diagram illustrating a case in which a leakage resistance 14 is generated between the terminal P− and the terminal BS−. While a charger is connected, a charging current is supplied from the charging IC 130. Accordingly, in the case where the leakage resistance 14 is generated, there is a possibility that the secondary battery 200 becomes overcharged because a leakage current 15, which goes through the leakage resistance 14, flows even when the charge control transistor 11 is turned off by the protecting IC 120.

Figure 6:
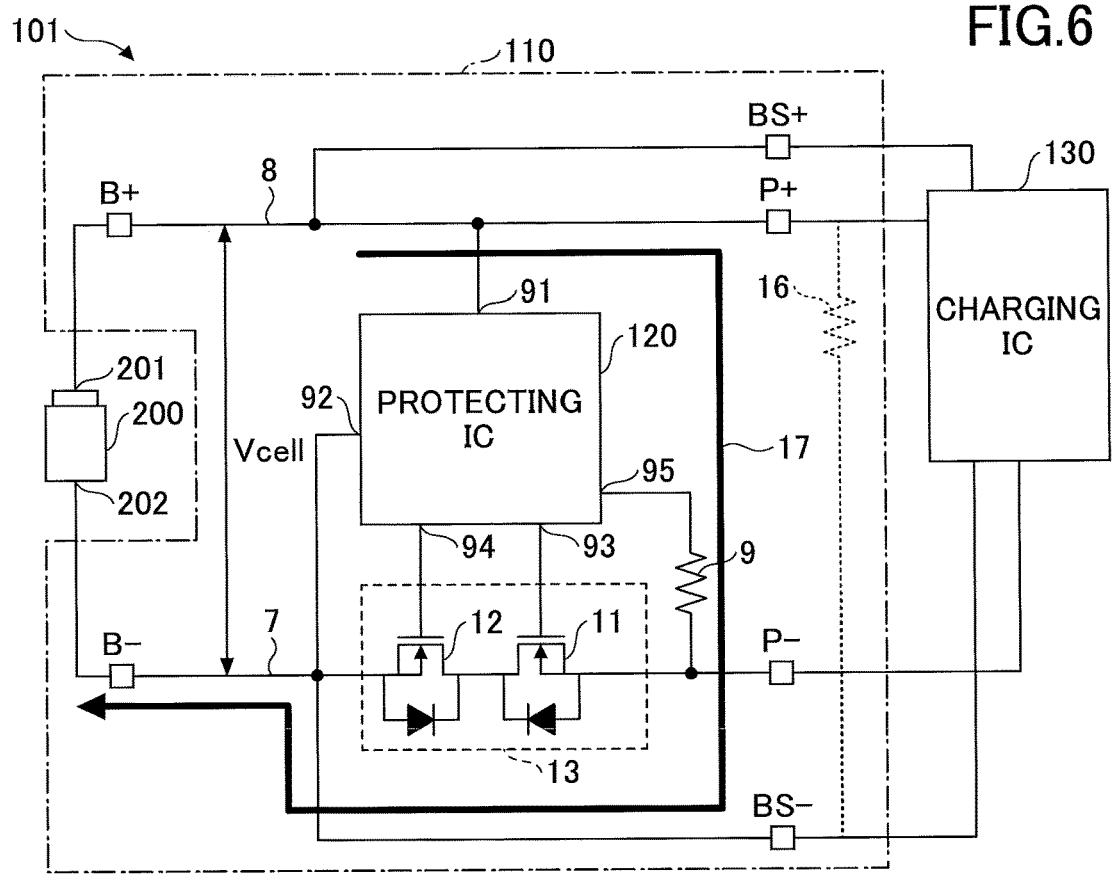
FIG. 6 is a diagram illustrating a case in which a leakage resistance is generated between a terminal P+ and the terminal BS−.

FIG. 6 is a diagram illustrating a case in which a leakage resistance 16 is generated between the terminal P+ and the terminal BS−. In the case where the leakage resistance 16 is generated, there is a possibility that the secondary battery 200 becomes over discharged because a leakage current 17, which goes through the leakage resistance 16, flows even when the discharge control transistor 12 is turned off by the protecting IC 120.

A second embodiment, which prevents the cases illustrated in FIG. 5 and FIG. 6, will be described. According to the second embodiment, the terminal BS− is connected to the terminal B− (the negative electrode 202 of the secondary battery 200) via the protecting IC 120, and overcharging and over discharging can be prevented.

Second Embodiment

Figure 7:
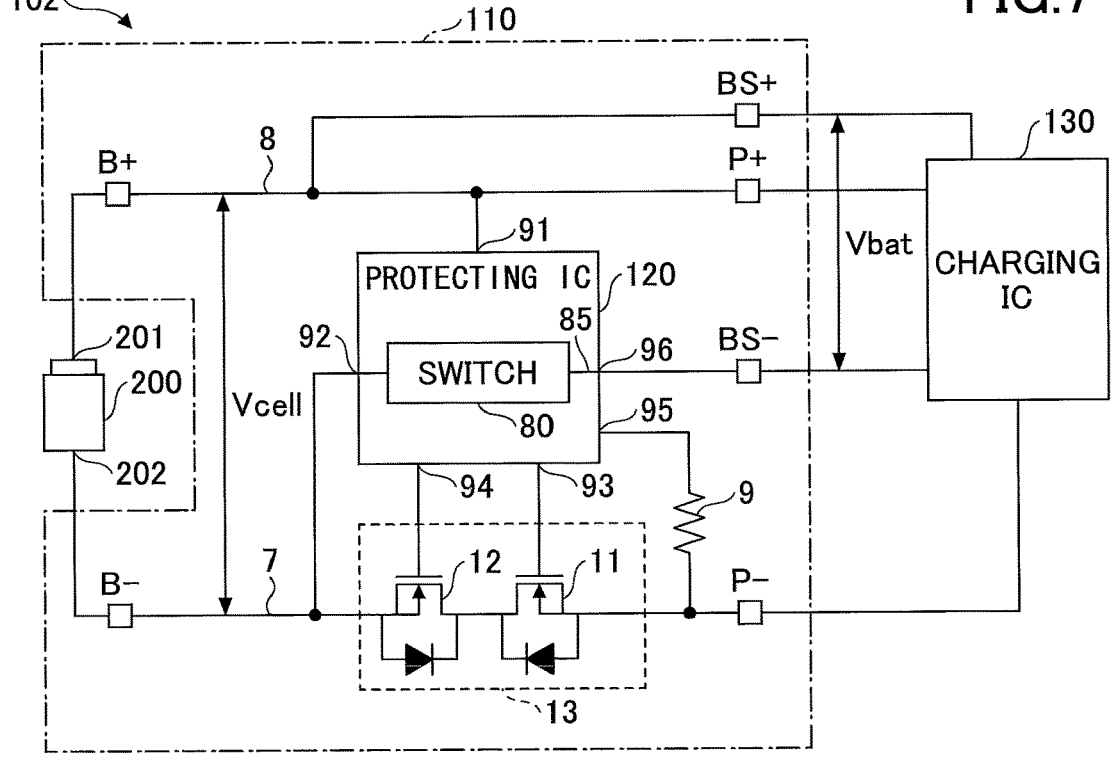
FIG. 7 is a diagram illustrating an example of a configuration of a battery protecting apparatus according to the second embodiment.

FIG. 7 is a diagram illustrating an example of a configuration of a battery protecting apparatus 102 according to the second embodiment. In the description of the second embodiment, configurations and effects equivalent to those of the above described embodiment are omitted or simplified appropriately by incorporating the above description. The battery protecting apparatus 102 illustrated in FIG. 7 is an example of a battery protecting apparatus that protects the secondary battery 200.

The battery protecting apparatus 102 includes the terminal B+, the terminal B−, the terminal P+, the terminal P−, the terminal BS+, and the terminal BS−. The terminal B+, the terminal B−, the terminal P+, and the terminal P− are similar to those described above.

The terminal BS− is an example of a first monitor terminal provided so that an electric potential of one electrode of the secondary battery 200 is monitorable. The terminal BS− is provided on the substrate 110 so that the charging IC 130 can monitor the electric potential of the negative electrode 202 of the secondary battery 200.

The terminal BS+ is an example of a second monitor terminal provided so that an electric potential of the other electrode of the secondary battery 200 is monitorable. The terminal BS+ is provided on the substrate 110 so that the charging IC 130 can monitor the electric potential of the positive electrode 201 of the secondary battery 200.

The protecting IC 120 includes the power supply terminal 91, the ground terminal 92, the charge control terminal 93, the discharge control terminal 94, the monitoring terminal 95, and a sense terminal 96. These terminals are external connection terminals for connecting one or more internal circuits of the protecting IC 120 to outside the protecting IC 120 such as an external circuit. The charge control terminal 93, the discharge control terminal 94, and the monitoring terminal 95 are similar to those described above.

The ground terminal 92 is an example of a first power supply terminal. The ground terminal 92 is connected to the negative side power supply path 7 between the negative electrode 202 and the switch circuit 13. The negative side power supply path 7 is an example of a first path.

The power supply terminal 91 is an example of a second power supply terminal. As illustrated in FIG. 7, the power supply terminal 91 is connected to a path between the positive electrode 201 and the terminal BS+. The path between the positive electrode 201 and the terminal BS+ is an example of a second path.

The sense terminal 96 is connected to the terminal BS− connected to the terminal BS− connected to the negative side monitor terminal of the charging IC 130.

The protecting IC 120 includes an internal wiring line 85 and an internal switch 80. The internal wiring line 85 connects the ground terminal 92 and the sense terminal 96. The internal wiring line 85 includes one terminal connected to the ground terminal 92, and the other terminal connected to the sense terminal 96. The internal switch 80 is inserted in series on the internal wiring line 85. The internal switch 80 is a switch element such as a MOS transistor.

Accordingly, when the protecting IC 120 turns on the internal switch 80, the terminal BS− is connected to the negative electrode 202 of the secondary battery 200 via the ground terminal 92. Accordingly, the charging IC 130 can detect the battery voltage Vcell of the secondary battery 200 by monitoring the terminal voltage Vbat between the terminal BS+ and the terminal BS−.

An electric current that flows through the terminal BS+ for monitoring the electric potential of the positive electrode 201 is minute in comparison with a charging/discharging current of the secondary battery 200 that flows through the terminal P+. Similarly, an electric current that flows through the terminal BS− for monitoring the electric potential of the negative electrode 202 is minute in comparison with a charging/discharging current of the secondary battery 200 that flows through the terminal P− and the switch circuit 13. Hence, because a voltage drop due to resistance of the switch circuit 13 and the like is not present, the terminal voltage Vbat is substantially equal to the battery voltage Vcell. Accordingly, the charging IC 130 can accurately detect the battery voltage Vcell by monitoring the terminal voltage Vbat between the terminal BS+ and the terminal BS−. Further, because the battery voltage Vcell can be accurately detected, similar to the first embodiment, it is possible to shorten a charging time for the battery voltage Vcell to reach the predetermined charging voltage as a whole (refer to FIG. 4).

Figure 8:
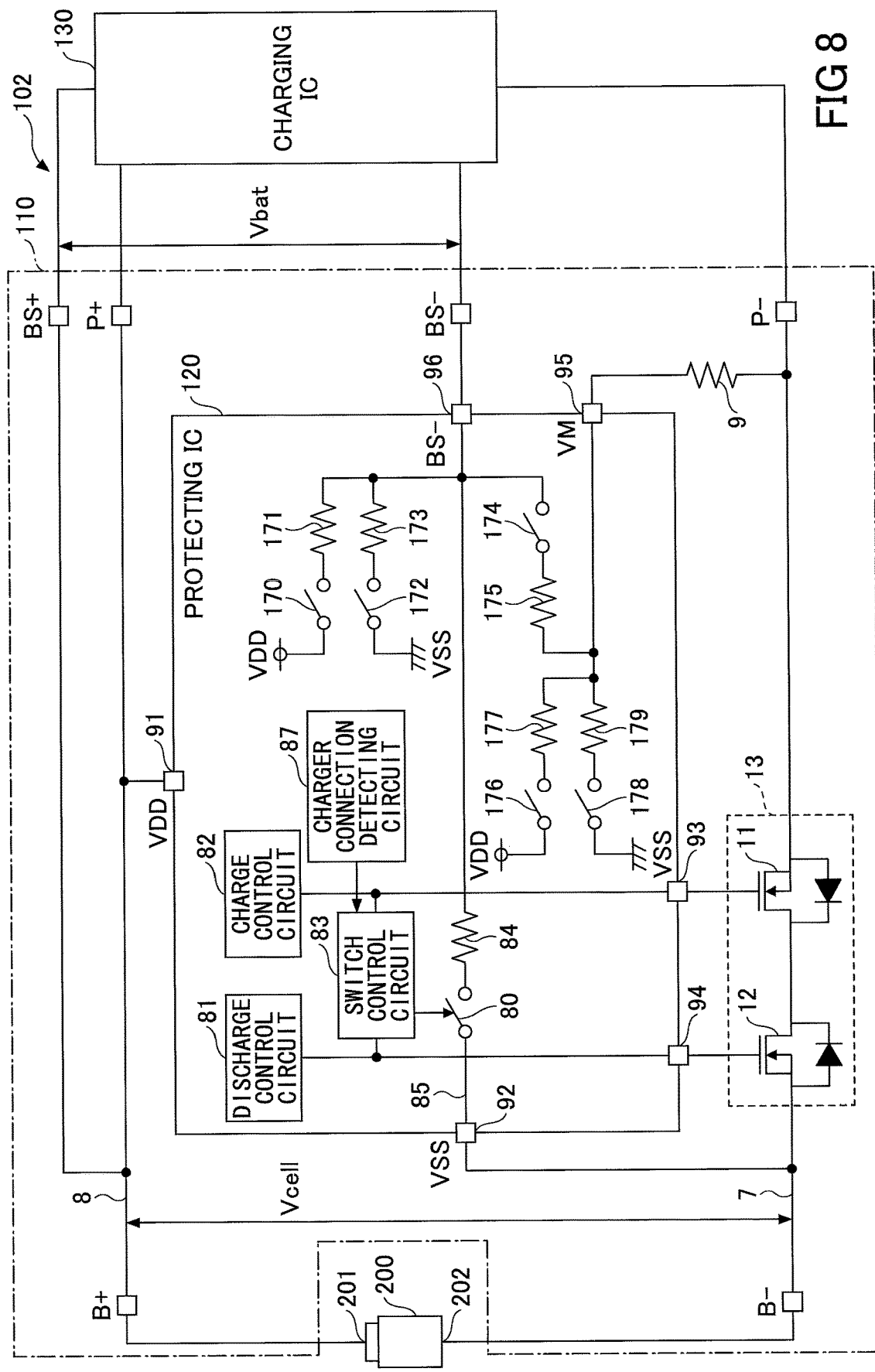
FIG. 8 is a diagram illustrating an example of a configuration of a battery protecting circuit according to the second embodiment.

FIG. 8 is a diagram illustrating an example of a configuration of a battery protecting circuit according to the second embodiment. The protecting IC 120 includes a discharge control circuit 81, a charge control circuit 82, a switch control circuit 83, the internal wiring line 85, the internal switch 80, an internal resistor 84, switches 170, 172, 174, 176, and 178, and resistors 171, 173, 175, 177, and 179.

The discharge control circuit 81 includes an abnormality detecting circuit that detects a discharge abnormality of the secondary battery 200. For example, the abnormality detecting circuit may detect that the secondary battery 200 abnormally discharges an electric current. The discharge control circuit 81 is an example of a control circuit that controls the switch circuit 13 based on a detection result of the abnormality detecting circuit in a case where the discharge abnormality of the secondary battery 200 is detected by the abnormality detecting circuit. The charge control circuit 82 includes an abnormality detecting circuit that detects a charge abnormality of the secondary battery 200. For example, the abnormality detecting circuit may detect that the secondary battery 200 is abnormally charged. The charge control circuit 82 is an example of a control circuit that controls the switch circuit 13 based on a detection result of the abnormality detecting circuit, in a case where the charge abnormality of the secondary battery 200 is detected by the abnormality detecting circuit.

The internal resistor 84 is inserted in series on the internal wiring line 85. Each of the switches 170, 172, 174, 176, and 178 is a switch element such as a MOS transistor.

The charge control circuit 82 includes an overcharge detecting circuit, which is an example of an abnormality detecting circuit. The overcharge detecting circuit detects overcharging of the secondary battery 200. The overcharging of the secondary battery 200 is an example of a predetermined abnormality. In other words, the charge control circuit 82 may detect that the secondary battery 200 is overcharged. The overcharge detecting circuit monitors a battery voltage VD between the power supply terminal VDD and the ground terminal VSS. When the overcharge detecting circuit that the battery voltage VD becomes greater than or equal to a predetermined overcharge detection threshold Vdet1, the charge control circuit 82 outputs, from the charge control terminal 93, a charge control signal for turning off the charge control transistor 11 (overcharge protection operation). Because an electric current in the charging direction of the secondary battery 200 is cut off by turning off the charge control transistor 11, the secondary battery 200 can be prevented from being overcharged.

The discharge control circuit 81 includes an over discharge detecting circuit, which is an example of an abnormality detecting circuit. The over discharge detecting circuit detects over discharging of the secondary battery 200. The over discharging of the secondary battery 200 is an example of a predetermined abnormality. In other words, the discharge control circuit 81 may detect that the secondary battery 200 over discharges an electric current. The over discharge detecting circuit monitors the battery voltage VD between the power supply terminal VDD and the ground terminal VSS. When the over discharge detecting circuit that the battery voltage VD becomes less than or equal to a predetermined over discharge detection threshold Vdet2, the discharge control circuit 81 outputs, from the discharge control terminal 94, a discharge control signal for turning off the discharge control transistor 12 (over discharge protection operation). Because an electric current in the discharging direction of the secondary battery 200 is cut off by turning off the discharge control transistor 12, the secondary battery 200 can be prevented from over discharging.

The discharge control circuit 81 includes a discharge overcurrent detecting circuit, which is an example of an abnormality detecting circuit. The discharge overcurrent detecting circuit detects a discharge overcurrent from the secondary battery 200. The discharge overcurrent of the secondary battery 200 is an example of a predetermined abnormality. The discharge overcurrent detecting circuit monitors a current detection voltage VI between the monitoring terminal VM and the ground terminal VSS. When the discharge overcurrent detecting circuit that the current detection voltage VD becomes greater than or equal to a predetermined discharge overcurrent detection threshold Vdet3, the discharge control circuit 81 outputs, from the discharge control terminal 94, a discharge control signal for turning off the discharge control transistor 12 (discharge overcurrent protection operation). Because an electric current in the discharging direction of the secondary battery 200 is cut off by turning off the discharge control transistor 12, it is possible to prevent the overcurrent from flowing in the direction of discharging the secondary battery 200.

The charge control circuit 82 includes a charge overcurrent detecting circuit, which is an example of an abnormality detecting circuit. The charge overcurrent detecting circuit detects a charge overcurrent to the secondary battery 200. The charge overcurrent of the secondary battery 200 is an example of a predetermined abnormality. The charge overcurrent detecting circuit monitors the current detection voltage VI between the monitoring terminal VM and the ground terminal VSS. When the charge overcurrent detecting circuit that the current detection voltage VI becomes less than or equal to a predetermined charge overcurrent detection threshold Vdet4, the charge control circuit 82 outputs, from the charge control terminal 93, a charge control signal for turning off the charge control transistor 11 (charge overcurrent protection operation). Because an electric current in the charging direction of the secondary battery 200 is cut off by turning off the charge control transistor 11, it is possible to prevent the overcurrent from flowing in the direction of charging the secondary battery 200.

FIG. 9 is a table illustrating a first example of switch control and terminal processing in each state.

When both overcharging of the secondary battery 200 and a charge overcurrent of the secondary battery 200 are not detected, the charge control circuit 82 turns on the charge control transistor 11. On the other hand, when at least one of overcharging of the secondary battery 200 and a charge overcurrent of the secondary battery 200 are detected, the charge control circuit 82 turns off the charge control transistor 11.

When both over discharging of the secondary battery 200 and a discharge overcurrent of the secondary battery 200 are not detected, the charge control circuit 82 turns on the discharge control transistor 12. On the other hand, when at least one of over discharging of the secondary battery 200 and a discharge overcurrent of the secondary battery 200 are detected, the discharge control circuit 81 turns off the discharge control transistor 12.

When overcharging, over discharging, a discharge overcurrent, and a charge overcurrent of the secondary battery 200 are not detected, the switch control circuit 83 turns on the internal switch 80. In this way, the electric potential of the terminal BS− becomes equal to the electric potential of the terminal B− to which the negative electrode of the secondary battery 200 is connected.

When at least one of overcharging of the secondary battery 200 and a charge overcurrent of the secondary battery 200 is detected, the switch control circuit 83 turns off the internal switch 80, and turns on the switch 174. For example, when a charge control signal for turning off the charge control transistor 11 is detected, the switch control circuit 83 turns off the internal switch 80 and turns on the switch 174. In this way, the monitoring terminal VM and the terminal BS– are shorted, and the terminal P– turns into high impedance (Hi-Z).

When over discharging of the secondary battery 200 is detected, the switch control circuit 83 turns off the internal switch 80 and turns on the switches 174, 170, and 176. For example, when a discharge control signal for turning off the discharge control transistor 12 is detected, the switch control circuit 83 turns off the internal switch 80 and turns on the switches 174, 170, and 176. In this way, the monitoring terminal VM and the terminal BS– are shorted, and the terminal P– is pulled up to the power supply terminal VDD. In this way, it is possible to inhibit progression of discharging from the secondary battery 200. Further, safety is ensured by electrically separating the charging IC 130 from the secondary battery 200.

When a discharge overcurrent of the secondary battery 200 is detected, the switch control circuit 83 turns off the internal switch 80 and turns on the switches 174, 172, and 178. For example, when a discharge control signal for turning off the discharge control transistor 12 is detected, the switch control circuit 83 turns off the internal switch 80 and turns on the switches 174, 172, and 178. In this way, the monitoring terminal VM and the terminal BS– are shorted, and the terminal P– is pulled down to the ground terminal VSS. In this way, it is possible to inhibit flow of a discharge overcurrent of the secondary battery 200. Further, safety is ensured by electrically separating the charging IC 130 from the secondary battery 200.

FIG. 10 is a table illustrating a second example of switch control and terminal processing in each state. In the following, description the same as FIG. 9 is omitted.

When at least one of overcharging of the secondary battery 200 and a charge overcurrent of the secondary battery 200 are detected, the switch control circuit 83 turns off the internal switch 80. For example, when a charge control signal for turning off the charge control transistor 11 is detected, the switch control circuit 83 turns off the internal switch 80. In this way, the terminal P– and the terminal BS– turn into high impedance (Hi-Z).

When over discharging of the secondary battery 200 is detected, the switch control circuit 83 turns off the internal switch 80 and turns on the switches 170 and 176. For example, when a discharge control signal for turning off the discharge control transistor 12 is detected, the switch control circuit 83 turns off the internal switch 80 and turns on the switches 170 and 176. In this way, the terminal P– and the terminal BS– are pulled up to the power supply terminal VDD. In this way, it is possible to inhibit progression of discharging of the secondary battery 200. Further, safety is ensured by electrically separating the charging IC 130 from the secondary battery 200.

When a discharge overcurrent of the secondary battery 200 is detected, the switch control circuit 83 turns off the internal switch 80 and turns on the switches 172 and 178. For example, when a discharge control signal for turning off the discharge control transistor 12 is detected, the switch control circuit 83 turns off the internal switch 80 and turns on the switches 172 and 178. In this way, the terminal P– and the terminal BS– are pulled down to the ground terminal VSS. In this way, it is possible to inhibit flow of the discharge overcurrent of the secondary battery 200.

Further, safety is ensured by electrically separating the charging IC 130 from the secondary battery 200.

FIG. 11 is a table illustrating a third example of switch control and terminal processing in each state. In the following, description the same as FIG. 9 and FIG. 10 is omitted. FIG. 11 illustrates a variation example of FIG. 9. FIG. 11 illustrates an example of switching on/off the internal switch 80 depending on whether a charger is connected. The table of FIG. 11 will be described with reference to FIGS. 12 to 14.

Figure 12:
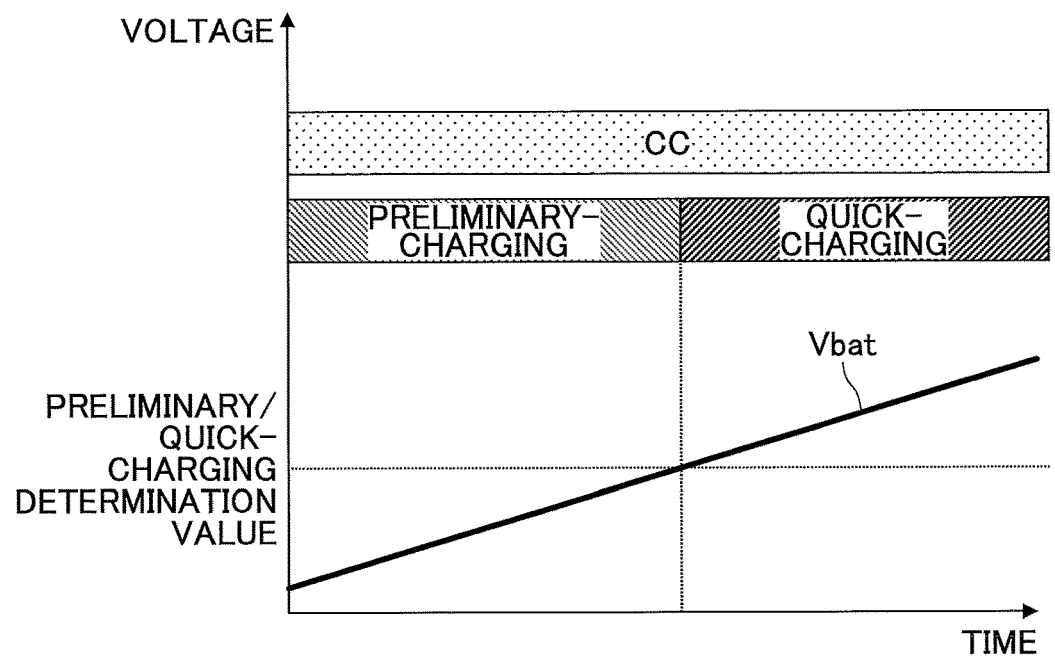
FIG. 12 is a graph illustrating an example of a determination value for a charging IC to switch a charging method between preliminary charging and quick charging.

FIG. 12 is a graph illustrating an example of a determination value for the charging IC 130 to switch a charging method between preliminary charging and quick charging. In a voltage state in which the terminal voltage Vbat is relatively low before reaching the predetermined charging voltage, the charging IC 130 performs CC charging by preliminary charging or quick charging. When the terminal voltage Vbat is lower than a preliminary/quick charging determination value, the charging IC 130 performs the preliminary charging with a constant current of which a current value is relatively low. When the terminal voltage Vbat is exceeding the preliminary/quick charging determination value, the charging IC 130 performs the quick charging with a constant current of which a current value is higher than that of the preliminary charging.

Figure 13:
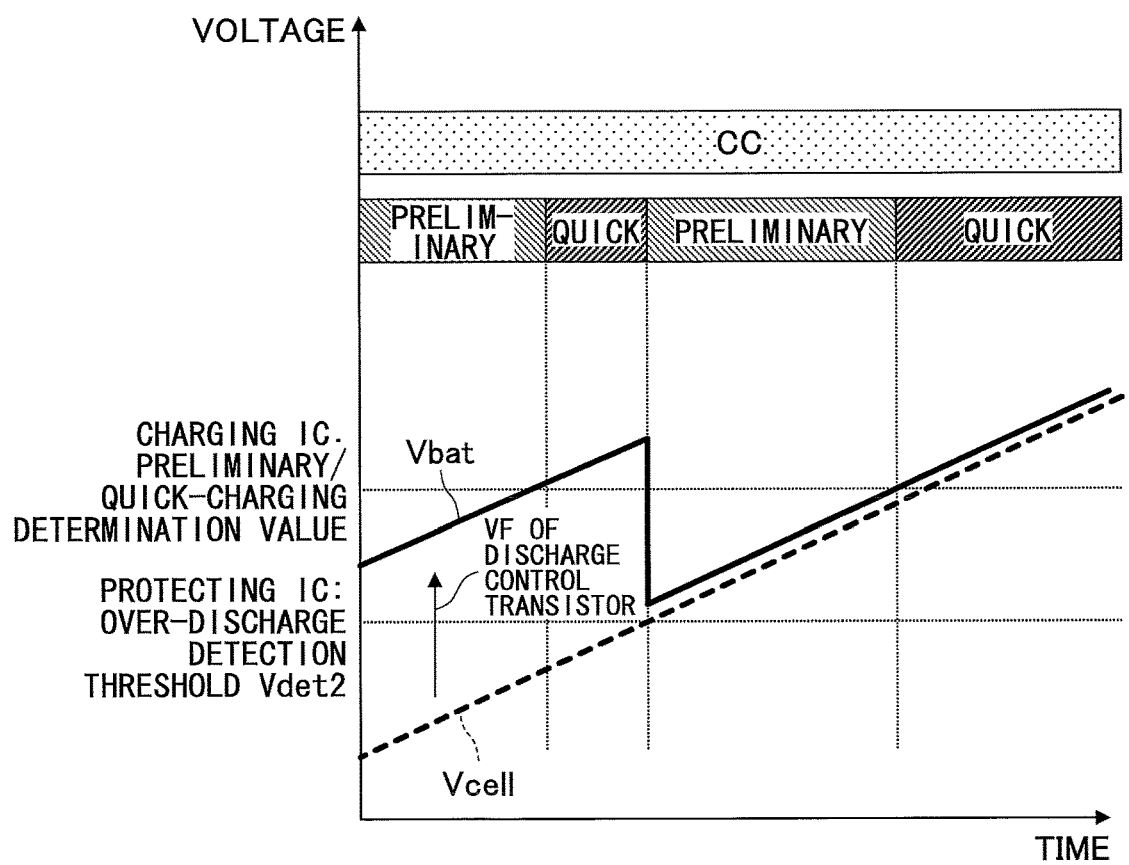
FIG. 13 is a graph illustrating a case of specifications (specifications of FIG. 9) in which an internal switch is off at the time of connecting a charger and over discharging.

FIG. 13 is a graph illustrating a case of specifications (specifications of FIG. 9) in which the internal switch 80 is off at the time of connecting a charger and over discharging. In a state in which over discharging is detected, a forward voltage VF of a parasitic diode of the discharge control transistor 12 is included in the terminal voltage Vbat because the discharge control transistor 12 is off and the switch 174 is on. Accordingly, depending on the over discharge detection threshold Vdet2, the preliminary/quick charging determination value or the forward direction voltage VF, the preliminary charging and the quick charging are wastefully repeated as illustrated in FIG. 13.

Figure 14:
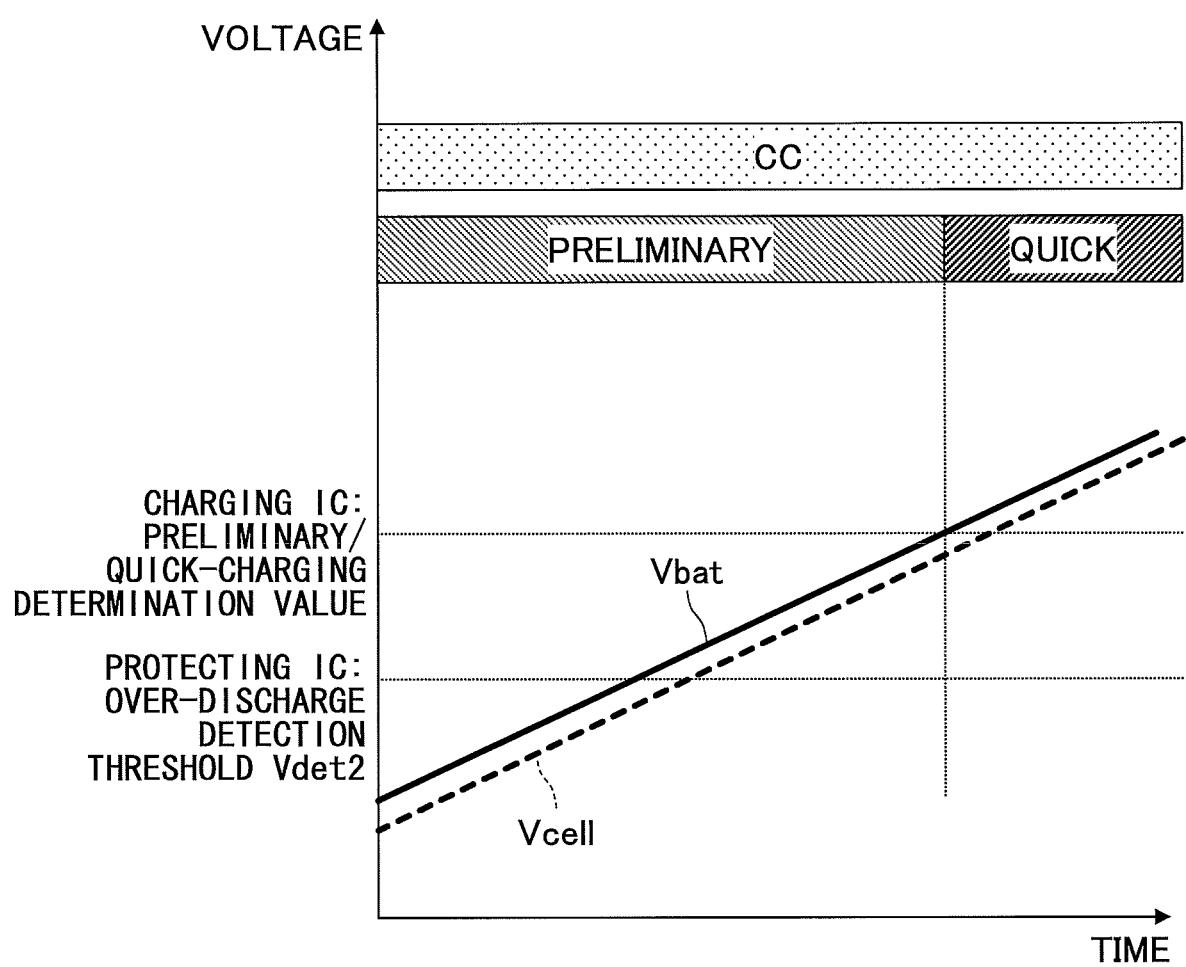
FIG. 14 is a graph illustrating a case of specifications (specifications of FIG. 11) in which the internal switch is on at the time of connecting a charger and over discharging.

Hence, as illustrated in FIG. 11, when both over discharging of the secondary battery 200 and connection of a charger are detected, the switch control circuit 83 turns on the internal switch 80. In this way, the electric potential of the terminal BS– becomes equal to the electric potential of the terminal B– to which the negative electrode of the secondary battery 200 is connected. Accordingly, by turning on the internal switch 80 at the time of connecting a charger and over discharging, the terminal voltage Vbat and the battery voltage Vcell are substantially equal to each other as illustrated in FIG. 14. Thereby, it is possible to prevent the preliminary charging and the rapid charging from being wastefully repeated. FIG. 14 is a graph illustrating a case of specifications (specifications of FIG. 11) in which the internal switch 80 is on at the time of connecting a charger and over discharging.

The protecting IC 120 includes a charger connection detecting circuit 87. The charger connection detecting circuit 87 monitors a monitor voltage VDM between the power supply terminal VDD and the monitoring terminal VM. For example, when over discharging is detected and also it is detected that the monitor voltage VDM is equal to or greater than a predetermined charger connection threshold Vdetc, the switch control circuit 83 turns on the internal switch 80. This is because the charging IC 130 applies a charging voltage that is greater than the charger connection threshold Vdetc between the terminal P+ and the terminal P– when a charger for charging the secondary battery 200 is connected.

Third Embodiment

Figure 15:
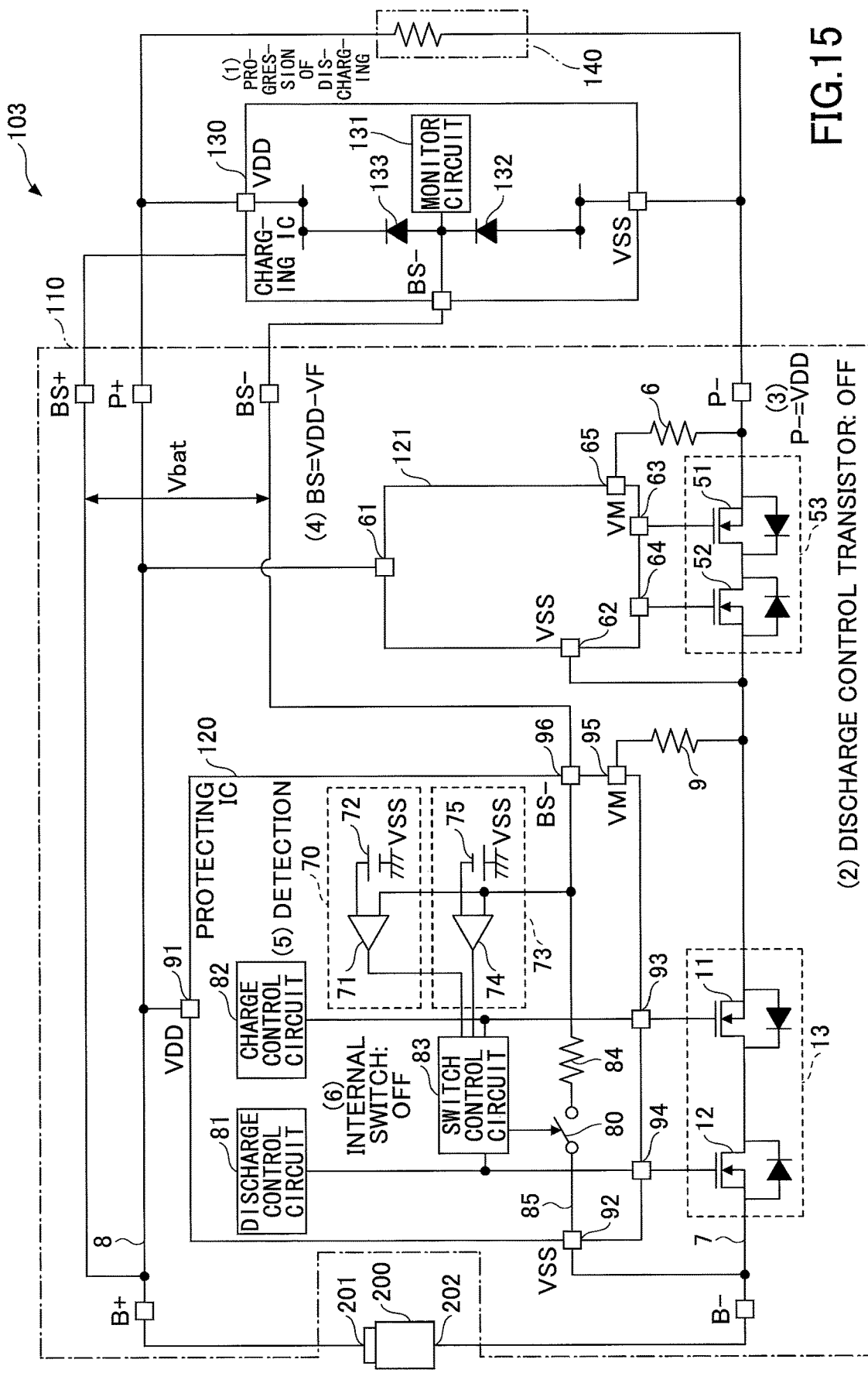
FIG. 15 is a diagram illustrating a first operating example and a configuration example of a battery protecting apparatus according to a third embodiment.

FIG. 15 is a diagram illustrating a first operating example and a configuration example of a battery protecting apparatus 103 according to a third embodiment. In the description of the third embodiment, configurations and effects equivalent to those of the above described embodiment(s) are omitted or simplified appropriately by incorporating the above description. The battery protecting apparatus 103 illustrated in FIG. 15 is an example of a battery protecting apparatus that protects the secondary battery 200.

The battery protecting apparatus 103 includes the protecting IC 120 and a protecting IC 121. The battery protecting apparatus 103 has a double protection function by the two protecting ICs 120 and 121. The protecting IC 120 and the protecting IC 121 have the same protection function. According to the double protection function, it is possible to protect the secondary battery 200 from over discharging and the like even if either the protecting IC 120 or the protecting IC 121 is broken. The battery protecting apparatus 103 includes the substrate 110. On the substrate 110, switch circuits 13 and 53, the protecting ICs 120 and 121, and resistors 9 and 6 are mounted.

The switch circuit 53 is inserted in series on the negative side power supply path 7 between the terminal B− and the terminal P−. For example, the switch circuit 53 may be a series circuit in which a charge control transistor 51 and a discharge control transistor 52 are connected in series.

The protecting IC 121 turns off the charge control transistor 51 to protect the secondary battery 200 from a charge abnormality such as overcharging and an overcurrent in the charging direction (a charge overcurrent), for example. Also, the protecting IC 121 turns off the discharge control transistor 52 to protect the secondary battery 200 from a discharge abnormality such as over discharging and an overcurrent in the discharging direction (a discharge overcurrent), for example.

The protecting IC 121 includes a power supply terminal 61, a ground terminal 62, a charge control terminal 63, a discharge control terminal 64, and a monitoring terminal 65. These terminals are external connection terminals for connecting internal circuits of the protecting IC 121 to outside the protecting IC 121 such as an external circuit. Further, internal circuits similar to those of the protecting IC 120 are connected to these terminals.

The protecting IC 120 includes the charger connection detecting circuit 87, the switches 170, 172, 174, 176, and 178, and the resistors 171, 173, 175, 177, and 179 illustrated in FIG. 8. Note that they are not illustrated in FIG. 15.

Further, the protecting IC 120 includes a first voltage abnormality detecting circuit 70 and a second voltage abnormality detecting circuit 73.

The first voltage abnormality detecting circuit 70 is an example of a voltage abnormality detecting circuit of the sense terminal, and detects that a positive abnormal voltage is generated in the terminal BS−. For example, the first voltage abnormality detecting circuit 70 includes a comparator 71, which compares a positive abnormal detection voltage 72 with the voltage of the terminal BS−, and outputs a comparison result to the switch control circuit 83. The positive abnormal detection voltage 72 may be 0.1 V, for example.

The second voltage abnormality detecting circuit 73 is an example of a voltage abnormality detecting circuit of the sense terminal, and detects that a negative abnormal voltage is generated in the terminal BS−. For example, the second voltage abnormality detecting circuit 73 includes a comparator 74, which compares a negative abnormal detection voltage 75 with the voltage of the terminal BS−, and outputs a comparison result to the switch control circuit 83. The negative abnormal detection voltage 75 may V, for example.

When the first voltage abnormality detecting circuit 70 detects that the voltage of the terminal BS− increases relative to the positive abnormal detection voltage 72, the switch control circuit 83 turns off the internal switch 80. When the second voltage abnormality detecting circuit 73 detects that the voltage of the terminal BS− decreases relative to the negative abnormal detection voltage 75, the switch control circuit 83 turns off the internal switch 80. In this way, it is possible to shut off a current path, which goes through the internal switch 80, when an abnormal voltage is generated in the terminal BS−.

The charging IC 130 includes a negative side monitor terminal BS− and a power supply terminal VDD, a ground terminal VSS, diodes 132 and 133, and a monitor circuit 131. The negative side monitor terminal BS− of the charging IC 130 is connected to the terminal BS− of the substrate 110. The power supply terminal VDD of the charging IC 130 is connected to the terminal P+ of the substrate 110. The ground terminal VSS of the charging IC 130 is connected to the terminal P− of the substrate 110. The diode 132 is a diode between the ground terminal VSS and the negative side monitor terminal BS−. For example, the diode 132 may be a parasitic diode. The diode 133 is a diode between the power supply terminal VDD and the negative side monitor terminal BS−. For example, the diode 133 may be a parasitic diode. The monitor circuit 131 monitors the terminal voltage Vbat between the terminal BS+ and the terminal BS− to detect the battery voltage Vcell of the secondary battery 200.

In FIG. 15, when the protecting IC 121 turns off the discharge control transistor 52 in response to detecting a discharge abnormality, the protecting IC 120 causes the first voltage abnormality detecting circuit 70 to detect a voltage abnormality of the terminal BS− to prevent an abnormal current from flowing through the internal wiring line 85. This preventing operation is as follows.

(1) Discharging from the secondary battery 200 proceeds due to a load 140, and the secondary battery 200 lapses into an over discharging state.

(2) Because the protecting IC 121 is set to detect the discharge abnormality before the protecting IC 120 detects the discharge abnormality, the protecting IC 121 turns off the discharge control transistor 52. For example, the over discharge detection threshold Vdet2 of the protecting IC 121 is set to be higher than the over discharge detection threshold Vdet2 of the protecting IC 120.

(3) The protecting IC 121 pulls up the monitoring terminal 65 to the power supply terminal 61 (see FIGS. 9 to 11). In this way, the terminal P− is pulled up to the electric potential of the positive side power supply path 8.

(4) When the terminal P− is pulled up to the electric potential of the positive side power supply path 8, the voltage of the sense terminal 96 of the protecting IC 120 increases to a voltage (VDD−VF) due to the presence of the diode 132 within the charging IC 130. Here, the VDD represents a power supply voltage between the power supply terminal 61 and the ground terminal 62, and the VF represents a forward voltage of the diode 132 between the negative side monitor terminal BS− of the charging IC 130 and the ground terminal VSS of the charging IC 130.

(5) The first voltage abnormality detecting circuit 70 detects that the voltage of the sense terminal 96 exceeds the positive abnormal detection voltage 72.

(6) When it is detected by the first voltage abnormality detecting circuit 70 that the voltage of the sense terminal 96 exceeds the positive abnormal detection voltage 72, the switch control circuit 83 turns off the internal switch 80. By turning off the internal switch 80, it is possible to prevent the secondary battery 200 from being continuously discharged via the internal wiring line 85 until the protecting IC 120 detects over discharging.

Figure 16:
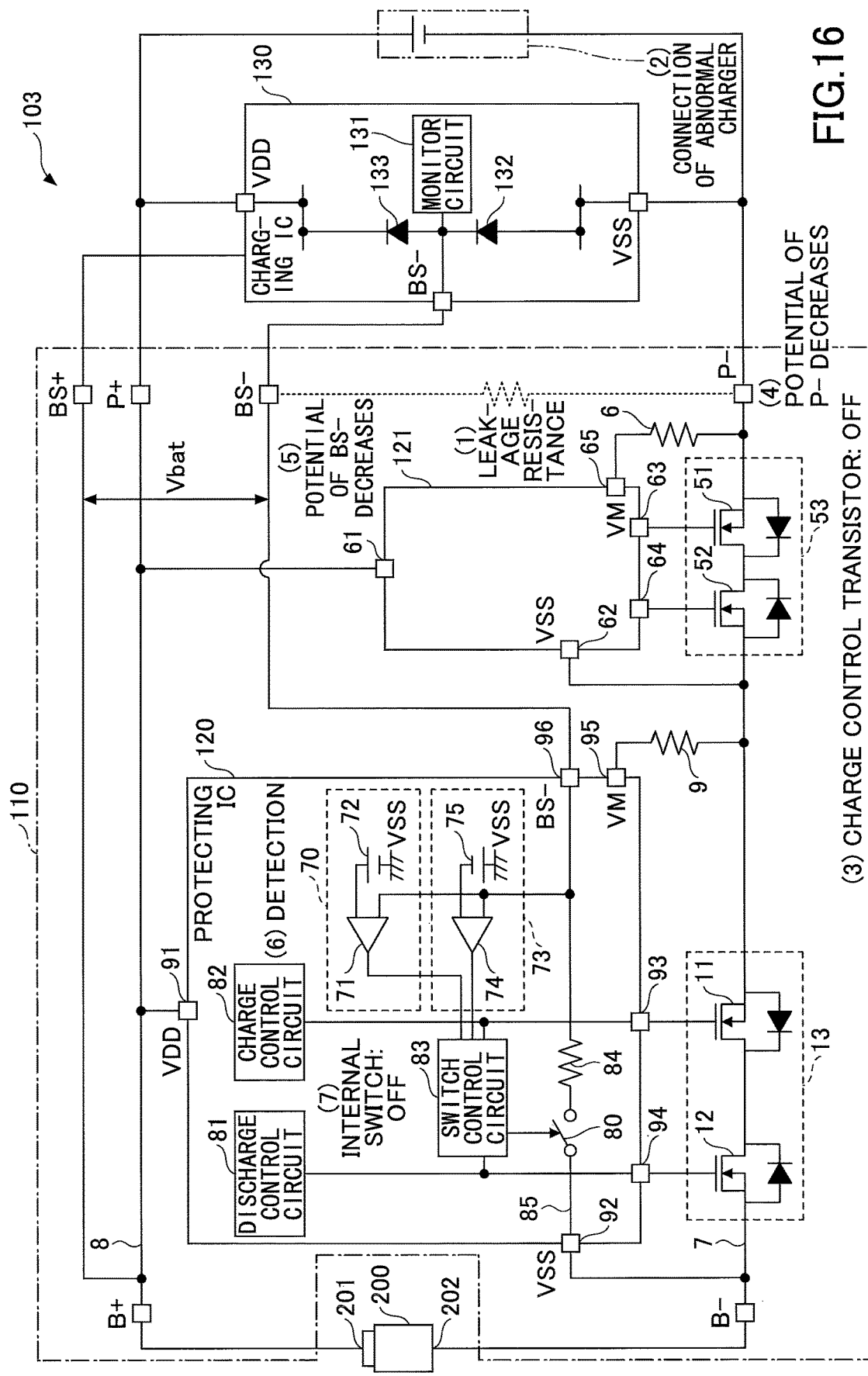
FIG. 16 is a diagram illustrating a second operating example and a configuration example of a battery protecting apparatus according to the third embodiment.

FIG. 16 is a diagram illustrating a second operating example and a configuration example of a battery protecting apparatus 103 according to the third embodiment. The second operating example illustrates an operation of a case in which a leakage resistance is generated between the terminal BS– and the terminal P– of the substrate 110 and an abnormal charger is connected. In this case, the protecting IC 120 causes the second voltage abnormality detecting circuit 73 to detect a voltage abnormality of the terminal BS– to prevent an abnormal current from flowing through the internal wiring line 85. This preventing operation is as follows.

(1) A leakage resistance is generated between the terminal BS– and the terminal P– of the substrate 110.
(2) An abnormal charger is connected.
(3) Because the protecting IC 121 is set to detect the charge abnormality before the protecting IC 120 detects the charge abnormality, the protecting IC 121 turns off the charge control transistor 51. For example, the overcharge detection threshold Vdet1 of the protecting IC 121 is set to be lower than the overcharge detection threshold Vdet1 of the protecting IC 120, and the charge overcurrent detection threshold Vdet4 of the protecting IC 121 is set to be higher than the charge overcurrent detection threshold Vdet4 of the protecting IC 120.
(4) By turning off the charge control transistor 51, an electric potential of the terminal P– decreases.
(5) The electric potential of the terminal BS– of the substrate 110 is decreased, by the presence of the leakage resistance, in response to the electric potential of the terminal P–.
(6) The second voltage abnormality detecting circuit 73 detects that the voltage of the sense terminal 96 becomes lower than the negative abnormal detection voltage 75.
(7) When it is detected by the second voltage abnormality detecting circuit 73 that the voltage of the sense terminal 96 becomes lower than the negative abnormal detection voltage 75, the switch control circuit 83 turns off the internal switch 80. By turning off the internal switch 80, it is possible to prevent the secondary battery 200 from being continuously charged via the internal wiring line 85 until the protecting IC 120 detects overcharging.

Fourth Embodiment

Figure 17:
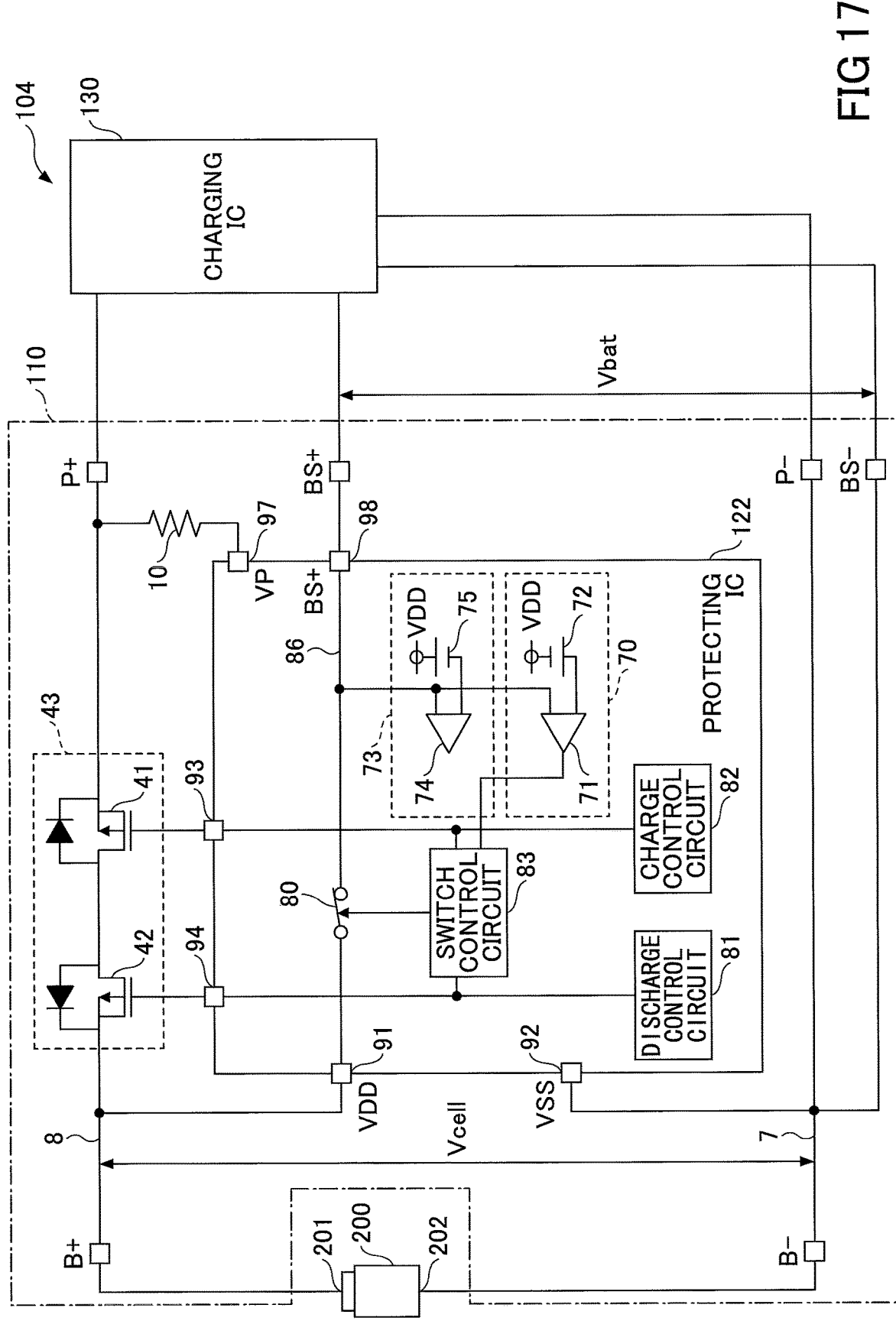
FIG. 17 is a diagram illustrating an example of a configuration of a battery protecting apparatus according to a fourth embodiment.

FIG. 17 is a diagram illustrating an example of a configuration of a battery protecting apparatus 104 according to a fourth embodiment. In the description of the fourth embodiment, configurations and effects equivalent to those of the above described embodiment(s) are omitted or simplified appropriately by incorporating the above description. The battery protecting apparatus 104 illustrated in FIG. 17 is an example of a battery protecting apparatus that protects the secondary battery 200.

In the above description of the embodiment, the switch circuits 13 and 53 are inserted in series on the negative side power supply path 7 at the low side. However, a switch circuit 43 illustrated in FIG. 17 is inserted in series on the positive side power supply path 8 at the high side.

The switch circuit 43 is inserted in series on the positive side power supply path 8 between the terminal B+ and the terminal P+. For example, the switch circuit 43 is a series circuit in which a charge control transistor 41 and a discharge control transistor 42 are connected in series. When the charge control transistor 41 is turned off, the positive side power supply path 8, through which a charging current to the secondary battery 200 flows, is shut off, and the charging current flow to the secondary battery 200 is prohibited (prevented). When the discharge control transistor 42 is turned off, the positive side power supply path 8, through which a discharging current from the secondary battery 200 flows, is shut off, and the discharging current flow from the secondary battery 200 is prohibited (prevented).

For example, each of the charge control transistor 41 and the discharge control transistor 42 is a p-channel MOSFET (Metal Oxide Semiconductor Field Effect Transistor).

In FIG. 17, the terminal BS+ of the substrate 110 is an example of a first monitor terminal provided so that an electric potential of one electrode of the secondary battery 200 is monitorable. The terminal BS+ is provided on the substrate 110 so that the charging IC 130 can monitor the electric potential of the positive electrode 201 of the secondary battery 200.

In FIG. 17, the terminal B– of the substrate 110 is an example of a second monitor terminal provided so that an electric potential of the other electrode of the secondary battery 200 is monitorable. The terminal BS– is provided on the substrate 110 so that the charging IC 130 can monitor the electric potential of the negative electrode 202 of the secondary battery 200.

The protecting IC 122 includes the power supply terminal 91, the ground terminal 92, the charge control terminal 93, the discharge control terminal 94, a monitoring terminal 97, and a sense terminal 98. These terminals are external connection terminals for connecting internal circuits of the protecting IC 122 to outside the protecting IC 122 such as an external circuit.

In FIG. 17, the power supply terminal 91 is an example of a first power supply terminal. The power supply terminal 91 is connected to the positive side power supply path 8 between the positive electrode 201 and the switch circuit 43. The positive side power supply path 8 is an example of a first path.

In FIG. 17, the ground terminal 92 is an example of a second power supply terminal. As illustrated in FIG. 17, the ground terminal 92 is connected to a path between the negative electrode 202 and the terminal BS–. The path between the negative electrode 202 and the terminal BS– is an example of a second path.

The monitoring terminal 97 is an example of a monitoring terminal that monitors an electric potential of the terminal P+. The monitoring terminal 97 is connected to the positive side power supply path 8 between the terminal P+ and the switch circuit 43. The monitoring terminal 97 is connected to the terminal P+ via a resistor 10. The monitoring terminal 97 may be referred to as a monitoring terminal VP.

The sense terminal 98 is connected to the terminal BS+ connected to the positive side monitor terminal of the charging IC 130.

The protecting IC 122 includes an internal wiring line 86 and the internal switch 80. The internal wiring line 86 connects the power supply terminal 91 and the sense terminal 98. The internal wiring line 86 includes one terminal connected to the power supply terminal 91, and the other terminal connected to the sense terminal 98. The internal switch 80 is inserted in series on the internal wiring line 86. The internal switch 80 is a switch element such as a MOS transistor.

Accordingly, when the protecting IC 122 turns on the internal switch 80, the terminal BS+ is connected to the positive electrode 201 of the secondary battery 200 via the power supply terminal 91. Accordingly, similar to the above described embodiment, the charging IC 130 can detect the battery voltage Vcell of the secondary battery 200 by monitoring the terminal voltage Vbat between the terminal BS+ and the terminal BS−.

Further, similar to the above described embodiment, the protecting IC 120 includes the first voltage abnormality detecting circuit 70 and the second voltage abnormality detecting circuit 73. The first voltage abnormality detecting circuit 70 is an example of a voltage abnormality detecting circuit of the sense terminal, and detects that an abnormal voltage, which is higher than the battery voltage VDD, is generated in the terminal BS+. The second voltage abnormality detecting circuit 73 is an example of a voltage abnormality detecting circuit of the sense terminal, and detects that an abnormal voltage, which is lower than the battery voltage VDD, is generated in the terminal BS+. Similar to the above described embodiment, the switch control circuit 83 controls the internal switch 80 based on a detection result of the first voltage abnormality detecting circuit 70 or the second voltage abnormality detecting circuit 73.

Fifth Embodiment

Figure 18:
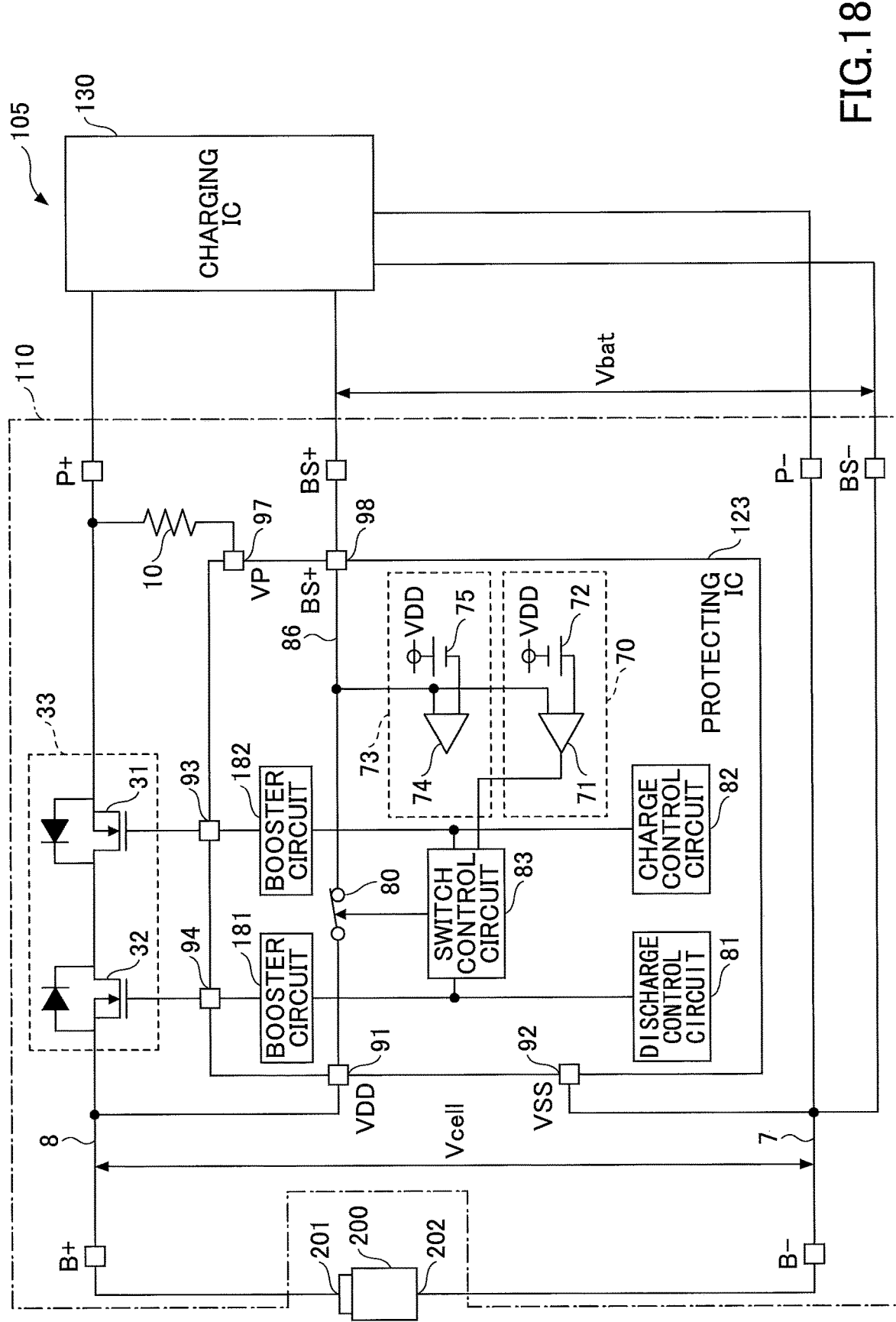
FIG. 18 is a diagram illustrating an example of a configuration of a battery protecting apparatus according to a fifth embodiment.

FIG. 18 is a diagram illustrating an example of a configuration of a battery protecting apparatus 105 according to a fifth embodiment. In the description of the fifth embodiment, configurations and effects equivalent to those of the above described embodiment(s) are omitted or simplified appropriately by incorporating the above description. The battery protecting apparatus 105 illustrated in FIG. 18 is an example of a battery protecting apparatus that protects the secondary battery 200.

Although the transistors of the switch circuit 43 in FIG. 17 are the p-channel MOSFETs, transistors in the switch circuit 33 illustrated in FIG. 18 are n-channel MOSFETs.

For example, the switch circuit 33 is a series circuit in which a charge control transistor 31 and a discharge control transistor 32 are connected in series. In order to control a gate of the n-channel charge control transistor 31, the protecting IC 123 includes a booster circuit 182 that boosts a charge control signal from the charge control circuit 82. In order to control a gate of the n-channel discharge control transistor 32, the protecting IC 123 includes a booster circuit 181 that boosts a discharge control signal from the discharge control circuit 81. For example, the booster circuit 182 is a charge pump circuit that increases voltage by combining a capacitor and a switch.

Sixth Embodiment

Figure 19:
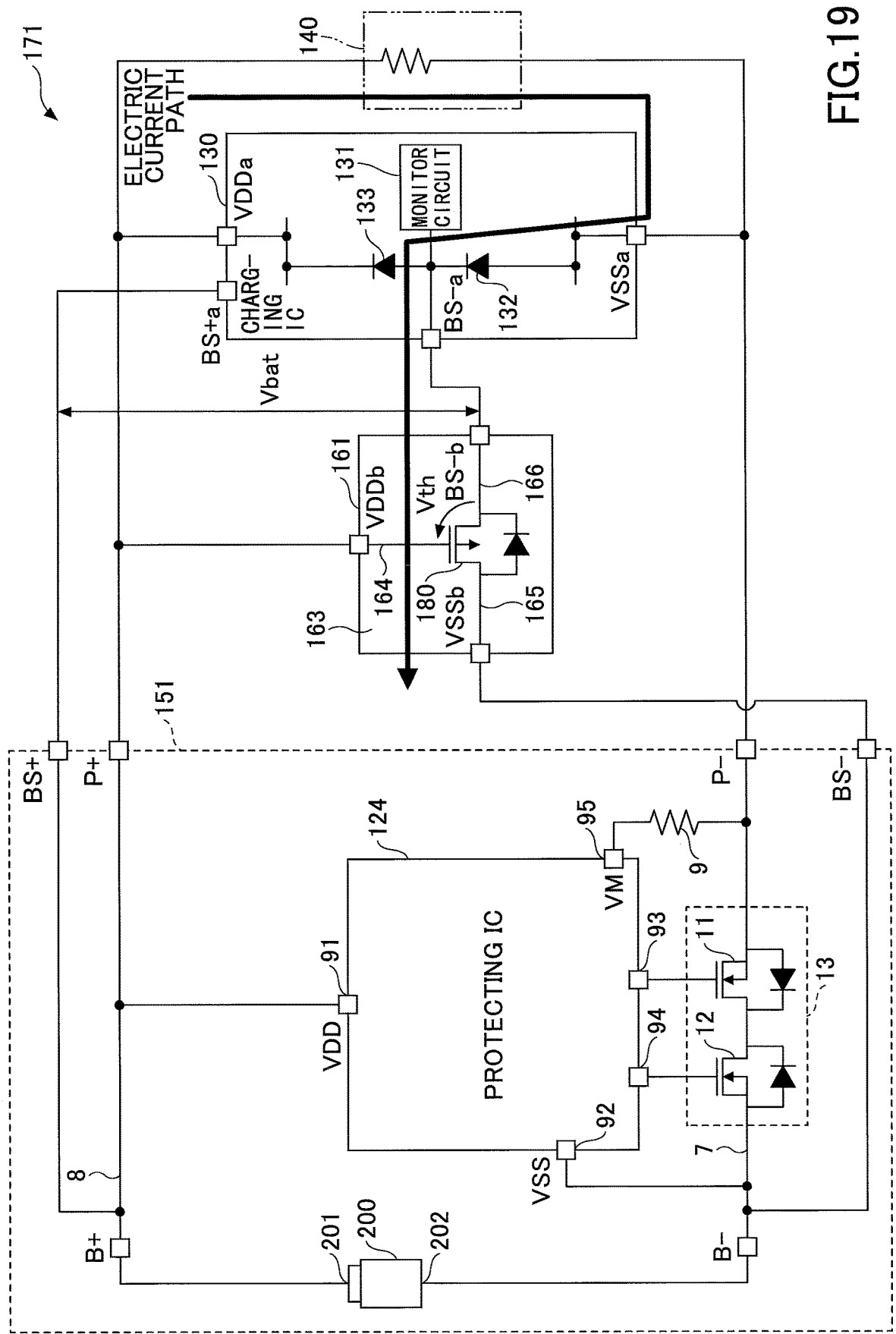
FIG. 19 is a diagram illustrating an example of a configuration of a charge control circuit according to a sixth embodiment.

FIG. 19 is a diagram illustrating an example of a configuration of a charge control circuit 171 according to a sixth embodiment. In the description of the sixth embodiment, configurations and effects equivalent to those of the above described embodiment(s) are omitted or simplified appropriately by incorporating the above description.

According to the above described embodiments, the abnormality detecting circuits, which detect a predetermined abnormality, and the switches, which are controlled to be off when the predetermined abnormality is detected, are arranged inside of the secondary battery protecting integrated circuit. However, such abnormality detecting circuits and such switches may be arranged outside the secondary battery protecting integrated circuit. According to the sixth embodiment illustrated in FIG. 19, such an abnormality detecting circuit and such a switch are arranged outside a battery pack 151 in which the secondary battery protecting integrated circuit is built.

The charge control circuit 171 illustrated in FIG. 19 includes a protection state detecting circuit 161 and a transistor 180. The protection state detecting circuit 161 is an example of an abnormality detecting circuit that detects a predetermined abnormality. The transistor 180 is an example of a switch that is controlled to be off when the predetermined abnormality is detected.

The charge control circuit 171 is an example of a charge control circuit that controls, from outside the battery pack 151, charging of the secondary battery 200, which is built (included) in the battery pack 151, based on electric potentials of electrodes (battery voltage, for example) of the secondary battery 200. Similar to the above described embodiments, the charge control circuit 171 includes the charging IC 130 that switches the method of charging the secondary battery 200 based on the terminal voltage Vbat. The charging IC 130 is an example of a charge control block that controls charging of the secondary battery 200.

The battery pack 151 includes the secondary battery 200, the switch circuit 13, the protecting IC 124, and a plurality of terminals BS+, P+, P−, and BS−.

Internal circuits of the battery pack 151 are connected to external circuits of the battery pack 151 via the terminals BS+, P+, P−, and BS−. Each of the terminals BS+, P+, P−, and BS− is exposed to the surface of the battery pack 151. The terminal BS− is an example of a first potential output terminal. The terminal BS+ is an example of a second potential output terminal. The terminal P− is an example of a first power terminal. The terminal P+ is an example of a second power terminal.

The terminal BS+ is connected to the positive electrode 201 so that an electric potential of the positive electrode 201 of the secondary battery 200 can be monitored from outside the battery pack 151. The terminal BS+ is an example of a potential output terminal that outputs the electric potential of the positive electrode 201 to outside the battery pack 151. The terminal BS− is connected to the negative electrode 202 so that an electric potential of the negative electrode 202 of the secondary battery 200 can be monitored from outside the battery pack 151. The terminal BS− is an example of a potential output terminal that outputs the electric potential of the negative electrode 202 to outside the battery pack 151 without going through the switch circuit 13. The terminal P+ is connected to the positive electrode 201 via the positive side power supply path 8. The terminal P− is connected to the negative electrode 202 via the switch circuit 13 inserted in series on the negative side power supply path 7.

The charging IC 130 includes a positive side monitor terminal BS+a, a negative side monitor terminal BS−a, a power supply terminal VDDa, a ground terminal VSSa, diodes 132 and 133, and a monitor circuit 131. The charging IC 130 is an example of a voltage detecting circuit. The charging IC 130 detects the battery voltage Vcell of the secondary battery 200 by monitoring the terminal voltage Vbat.

The positive side monitor terminal BS+a is connected to the terminal BS+ of the battery pack 151. The negative side monitor terminal BS−a is connected to the terminal BS− of the battery pack 151 via the transistor 180. The power supply terminal VDDa is connected to the terminal P+ of the battery pack 151 and to one end of the load 140. The ground terminal VSSa is connected to the terminal P− of the battery pack 151 and to the other end of the load 140. The ground terminal VSSa is connected to the negative electrode 202 via the switch circuit 13.

The diode 132 is disposed between the ground terminal VSSa and a point (monitor input part) between the negative side monitor terminal BS−a and the monitor circuit 131. For example, the diode 132 may be a parasitic diode. The diode 132 includes a cathode, connected to the monitor input part between the negative side monitor terminal BS−a and the monitor circuit 131, and an anode, connected to the ground terminal VSSa.

The diode 133 is disposed between the power supply terminal VDDa and the point (monitor input part) between the negative side monitor terminal BS−a and the monitor circuit 131. For example, the diode 133 may be a parasitic diode. The diode 133 includes an anode, connected to the monitor input part between the negative side monitor terminal BS−a and the monitor circuit 131, and a cathode, connected to the power supply terminal VDDa.

The monitor circuit 131 is an example of a monitor part that monitors the electric potentials of the electrodes of the secondary battery 200.

The monitor circuit 131 monitors an electric potential of the positive side monitor terminal BS+a and an electric potential of the negative side monitor terminal BS−a to monitor the terminal voltage Vbat between the terminal BS+ and the terminal BS−.

The monitor circuit 131 monitors the terminal voltage Vbat to detect the battery voltage Vcell of the secondary battery 200.

The transistor 180 is an example of a switch, which is disposed between the negative electrode 202 and the monitor circuit 131 and is inserted in series on a path that connects the negative electrode 202 and the monitor circuit 131. For example, the transistor 180 is an example of a p-channel MOSFET, which includes a gate that is connected to the positive electrode 201 via the terminal P+, a drain that is connected to the negative electrode 202 via the terminal BS−, and a source that is connected to the monitor circuit 131 via the terminal BS−a. The transistor 180 is disposed between the terminal BS− and the monitor circuit 131. The gate of the transistor 180 is connected to the terminal P+ and the power supply terminal VDDa.

The protection state detecting circuit 161 is an example of a protection state detecting part. When a state (protection state of the secondary battery 200) in which the protecting IC 124, which has detected a predetermined abnormality, protects the secondary battery 200 is detected, the protection state detecting circuit 161 turns off the transistor 180.

For example, the protection state detecting circuit 161 includes a circuit board 163, which includes a terminal VDDb connected to the terminal P+, a terminal VSSb connected to the terminal BS−, and a terminal BS−b connected to the terminal BS−a. The circuit board 163 includes a wiring line 164 that connects the gate of the transistor 180 to the terminal VDDb, a wiring line 165 that connects the drain of the transistor 180 to the terminal VSSb, and a wiring line 166 that connects the source of the transistor 180 to the terminal BS−b.

The protecting IC 124 is an example of a secondary battery protecting integrated circuit. The protecting IC 124 protects the secondary battery 200 by controlling the switch circuit 13. Similar to the above described embodiment(s), the protecting IC 124 turns off the charge control transistor 11 to protect the secondary battery 200 from a charge abnormality such as overcharging and an overcurrent in the charging direction (a charge overcurrent), for example. Also, the protecting IC 124 turns off the discharge control transistor 12 to protect the secondary battery 200 from a discharge abnormality such as over discharging and an overcurrent in the discharging direction (a discharge overcurrent), for example.

Similar to the above described embodiment(s), the protecting IC 124 detects over discharging of the secondary battery 200, which is an example of a predetermined abnormality. When it is detected that the secondary battery 200 over discharges, the protecting IC 124 connects the monitoring terminal VM and the power supply terminal VDD within the protecting IC 124 by turning off the discharge control transistor 12 and turning off at least one of switches within the protecting IC 124. The terminal P− is pulled up to the power supply terminal VDD by connecting the monitoring terminal VM and the power supply terminal VDD within the protecting IC 124. In this way, the battery pack 151 enters a state in which the protecting IC 124 protects the secondary battery 200 from over discharging.

By pulling up the terminal P− to the power supply terminal VDD, a difference in electric potential between the terminal P+ and the terminal P− is decreased. Therefore, a difference in electric potential between the VDDb terminal and the BS−b terminal (a voltage between the gate and the source of the transistor 180) is also decreased. Accordingly, when the voltage between the gate and the source of the transistor 180 is decreased to be less than a threshold voltage Vth pf the transistor 180, the protection state detecting circuit 161 can detect a state in which the protecting IC 124 protects the secondary battery 200 from over discharging.

Because the transistor 180 is turned off when the voltage between the gate and the source of the transistor 180 is decreased to be less than the threshold voltage Vth of the transistor 180, it is possible to shut off an electric current path illustrated by arrow in FIG. 19. The electric current path illustrated by the arrow in FIG. 19 represents a path through which a discharging current flows through the terminal P+, the load 140, the terminal VSSa, the diode 132, the terminal BS−a, the transistor 180, and the terminal BS−, in this order. Accordingly, by turning off the transistor 180, further flow of discharging current from the secondary battery 200 can be prevented, in the state in which the secondary battery 200 is protected from over discharging.

Seventh Embodiment

Figure 20:
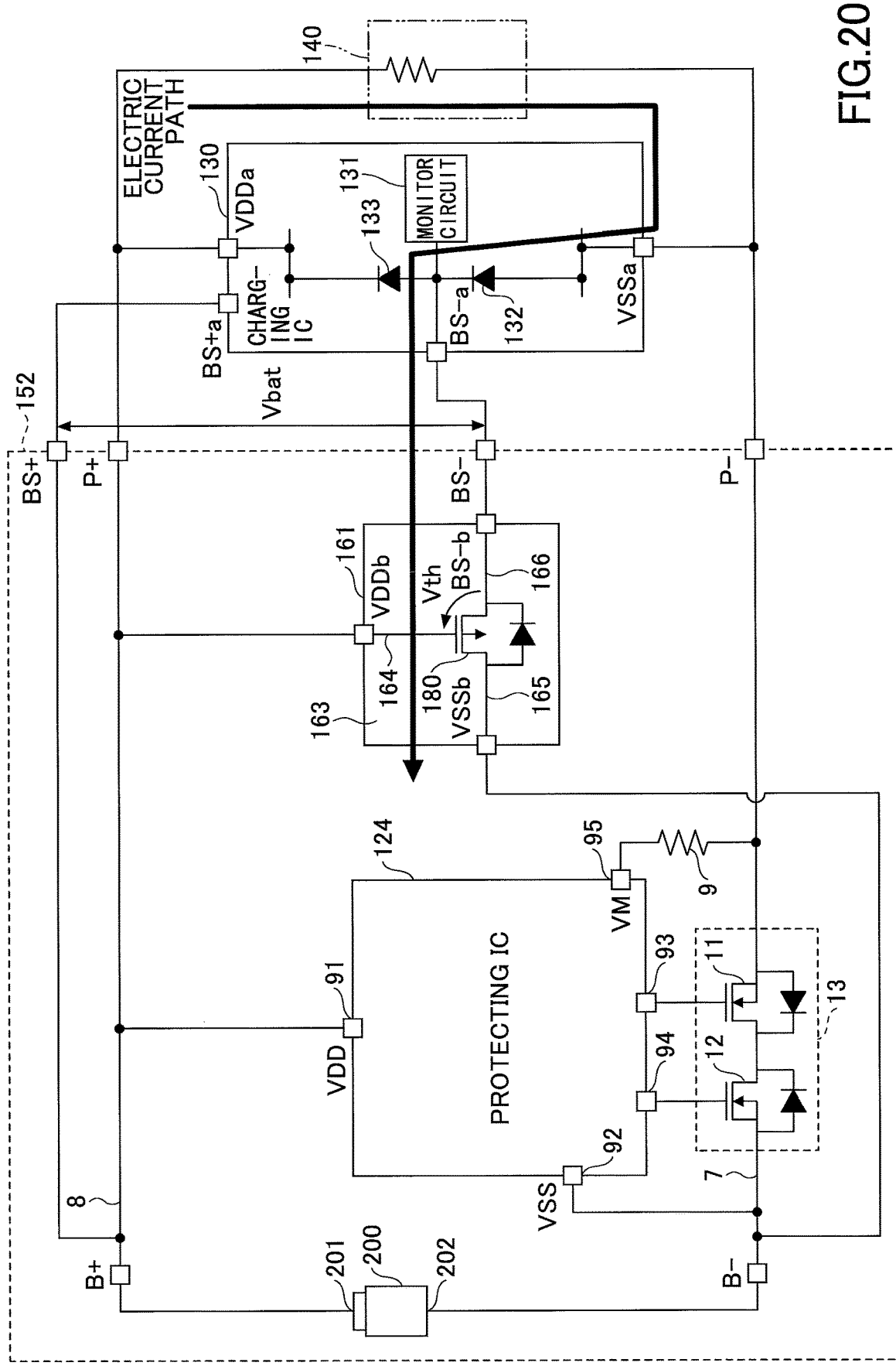
FIG. 20 is a diagram illustrating an example of a configuration of a battery pack according to a seventh embodiment.

FIG. 20 is a diagram illustrating an example of a configuration of a battery pack 152 according to a seventh embodiment. In the description of the seventh embodiment, configurations and effects equivalent to those of the above described embodiment(s) are omitted or simplified appropriately by incorporating the above description.

According to the sixth embodiment illustrated in FIG. 19, the protection state detecting circuit 161 is arranged outside the battery pack 151. In contrast, according to the seventh embodiment illustrated in FIG. 20, the protection state detecting circuit 161 is arranged inside of the battery pack 152. Similar to the sixth embodiment, according to the seventh embodiment, by turning off the transistor 180, further flow of discharging current from the secondary battery 200 can be prevented, in the state in which the secondary battery 200 is protected from over discharging.

Eighth Embodiment

Figure 21:
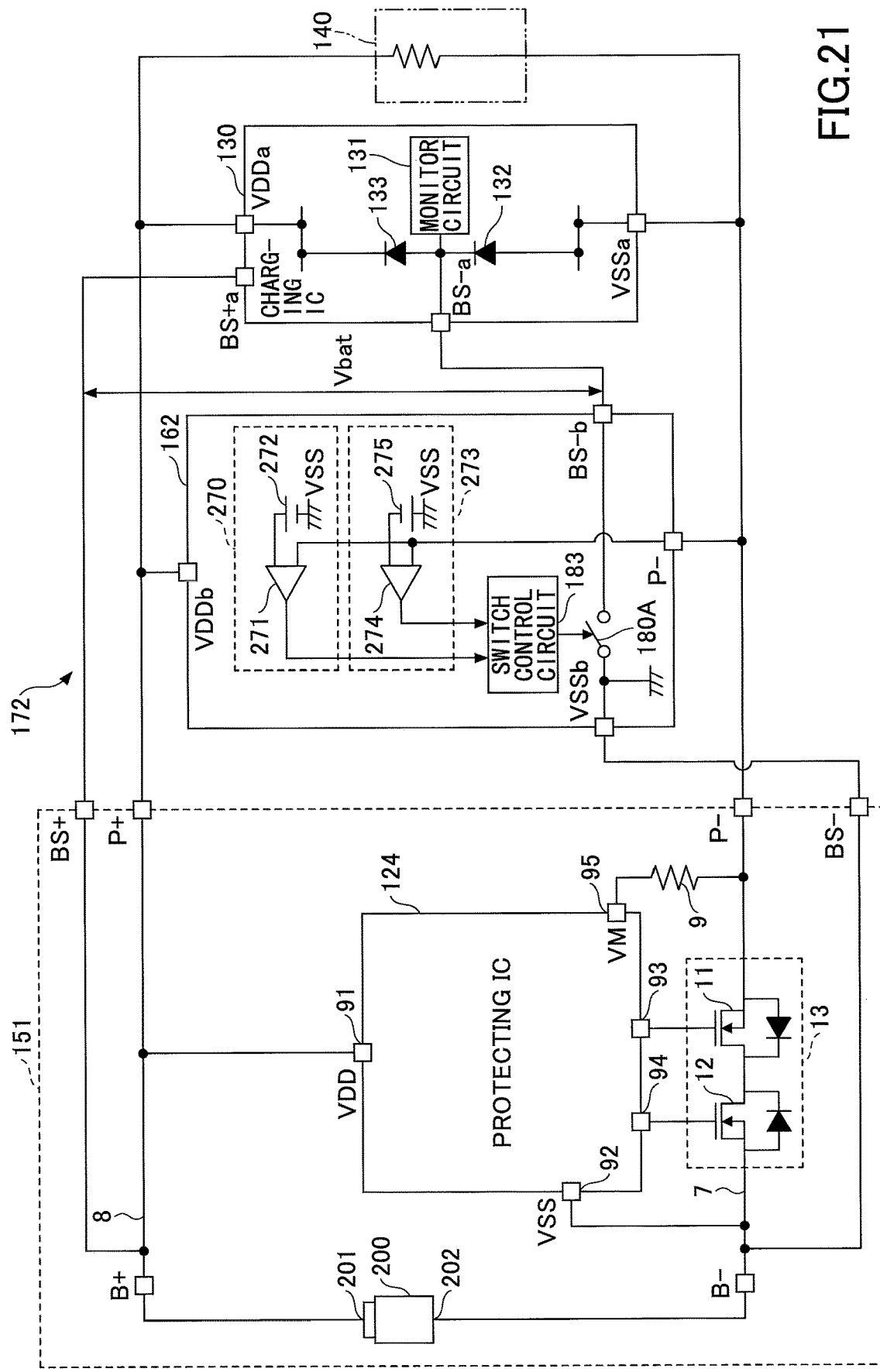
FIG. 21 is a diagram illustrating an example of a configuration of a charge control circuit according to an eighth embodiment.

FIG. 21 is a diagram illustrating an example of a configuration of a charge control circuit 172 according to an eighth embodiment. In the description of the eighth embodiment, configurations and effects equivalent to those of the above described embodiment(s) are omitted or simplified appropriately by incorporating the above description.

According to the eighth embodiment illustrated in FIG. 21, a switch 180A is turned off when either a charge abnormality or a discharge abnormality is detected.

The switch 180A is arranged between the battery pack 151 and the charging IC 130. Specifically, the switch 180A is arranged between the terminal BS– of the battery pack 151 and the terminal BS–a of the charging IC 130. In a case where the protecting IC 124 within the battery pack 151 detects a charge abnormality and turns off the charge control transistor 11, or a case where the protecting IC 124 detects a discharge abnormality and turns off the discharge control transistor 12, the protection state detecting circuit 162 turns off the switch 180A. The protection state detecting circuit 162 is an example of a protection state detecting part.

When the protecting IC 124 detects a charge abnormality and turns off the charge control transistor 11, the battery pack 151 enters a state in which the protecting IC 124 protects the secondary battery 200 from the charge abnormality. On the other hand, when the protecting IC 124 detects a discharge abnormality and turns off the discharge control transistor 12, the battery pack 151 enters a state in which the protecting IC 124 protects the secondary battery 200 from the discharge abnormality.

The protection state detecting circuit 162 detects a difference in electric potential between the terminal BS– and the terminal P– to detect that the protecting IC 124 turns off the charge control transistor 11 or the discharge control transistor 12.

When the protecting IC 124 turns on both the discharge control transistor 12 and the charge control transistor 11, the electric potential of the terminal P– is substantially equal to the electric potential of the terminal BS–.

In a case where the protecting IC 124 turns off the discharge control transistor 12, because the protecting IC 124 turns on at least one of switches within the protecting IC 124 to pull up the terminal P– to the power supply terminal VDD, the electric potential of the terminal P– increases to be higher than the electric potential of the terminal BS–.

In a case where the protecting IC 124 turns off the charge control transistor 11, the electric potential of the terminal P– is increased, by a forward direction voltage of the diode of the charge control transistor 11, to be higher than the electric potential of the terminal BS– when a load is connected or there is no load between the terminal P+ and the terminal P–.

In a case where the protecting IC 124 turns off the charge control transistor 11, the electric potential of the terminal P– is decreased, by turning off the charge control transistor 11, to be lower than the electric potential of the terminal BS– when a charging voltage is applied between the terminal P+ and the terminal P–.

Using the above points, the protection state detecting circuit 162 includes potential difference detecting circuits 270 and 273, which detect a difference in electric potential between the terminal BS– and the terminal P–, and a switch control circuit 183, which turns off the switch 180A based on a detection result of the electric potential difference detected by the potential difference detecting circuits 270 and 273. In this way, it is possible to turn off the switch 180A within the protection state detecting circuit 162 in cooperation with the protecting operation of the secondary battery 200 by the protecting IC 124.

The first potential difference detecting circuit 270 is an example of a potential difference detecting circuit that detects a difference in electric potential between the terminal BS– and the terminal P– and detects generation of a positive potential difference. For example, the first potential difference detecting circuit 270 includes a comparator 271, which compares a positive threshold voltage 272 with the difference in electric potential between the terminal BS– and the terminal P–, and outputs a comparison result to the switch control circuit 183. The positive threshold voltage 272 may be 0.1 V, for example.

The second potential difference detecting circuit 273 is an example of a potential difference detecting circuit that detects a difference in electric potential between the terminal BS– and the terminal P– and detects generation of a negative potential difference. For example, the second potential difference detecting circuit 273 includes a comparator 274, which compares a negative threshold voltage 275 with the difference in electric potential between the terminal BS– and the terminal P–, and outputs a comparison result to the switch control circuit 183. The negative threshold voltage 275 may be –0.1 V, for example.

When the first potential difference detecting circuit 270 detects that the difference in electric potential between the terminal BS– and the terminal P increases relative to the positive threshold voltage 272, the switch control circuit 183 turns off the switch 180A. When the second potential difference detecting circuit 273 detects that the difference in electric potential between the terminal BS– and the terminal P decreases relative to the negative threshold voltage 275, the switch control circuit 183 turns off the switch 180A. In this way, it is possible to shut off an electric current path, which goes through the switch 180A, when an abnormal voltage is generated in the difference in electric potential between the terminal BS– and the terminal P (that is, when a discharge abnormality or a charge abnormality is detected).

Ninth Embodiment

Figure 22:
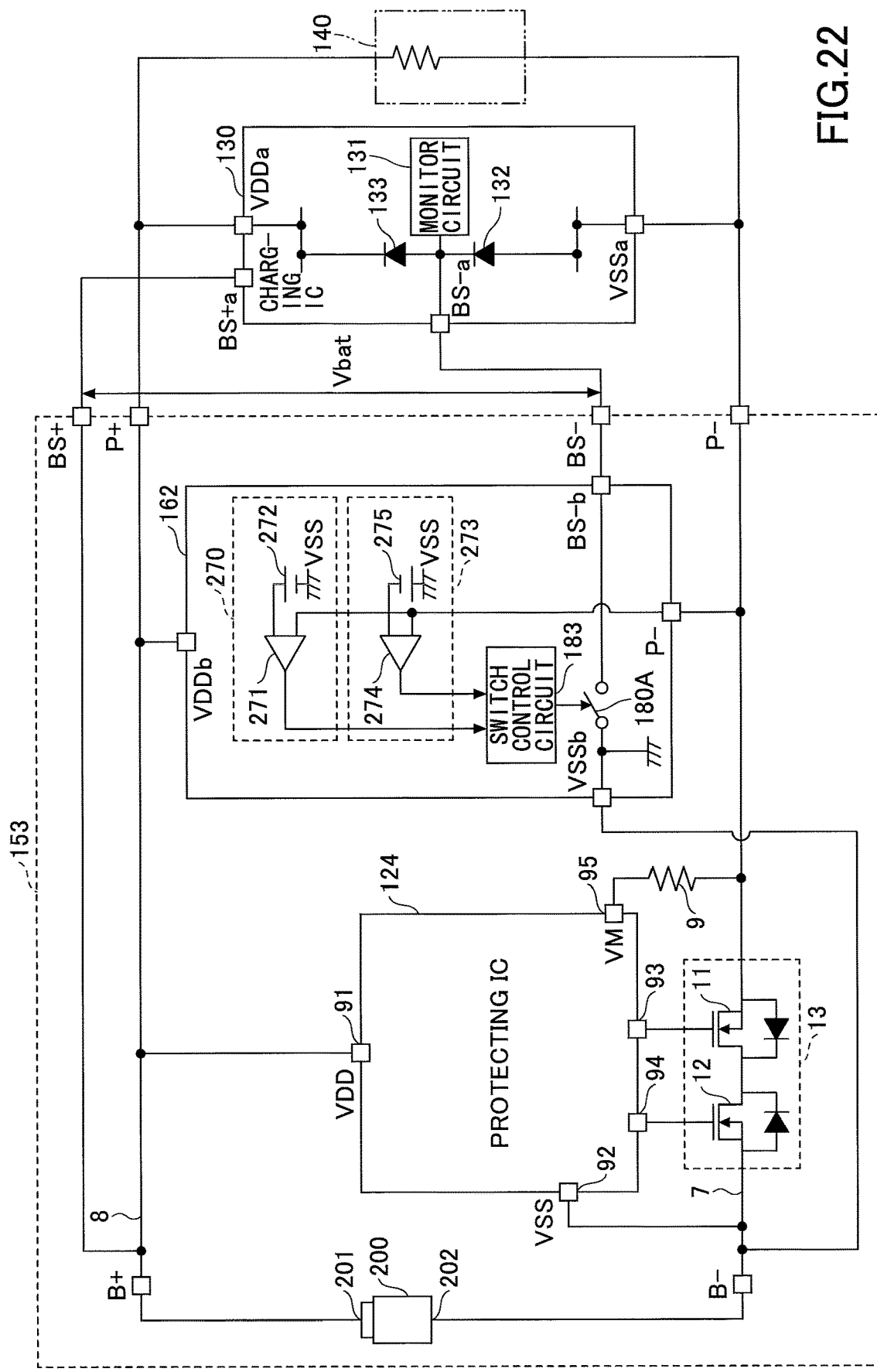
FIG. 22 is a diagram illustrating an example of a configuration of a battery pack according to a ninth embodiment.

FIG. 22 is a diagram illustrating an example of a configuration of a battery pack 153 according to a ninth embodiment.

In the description of the ninth embodiment, configurations and effects equivalent to those of the above described embodiment(s) are omitted or simplified appropriately by incorporating the above description.

According to the eighth embodiment illustrated in FIG. 21, the protection state detecting circuit 162 is arranged outside the battery pack. In contrast, according to the ninth embodiment illustrated in FIG. 22, the protection state detecting circuit 162 is arranged inside of the battery pack 153. Similar to the eighth embodiment, according to the ninth embodiment, by turning off the switch 180A, further flow of charging current or discharging current can be prevented, in the state in which the secondary battery 200 is protected from a charge abnormality or a discharge abnormality.

Tenth Embodiment

Figure 23:
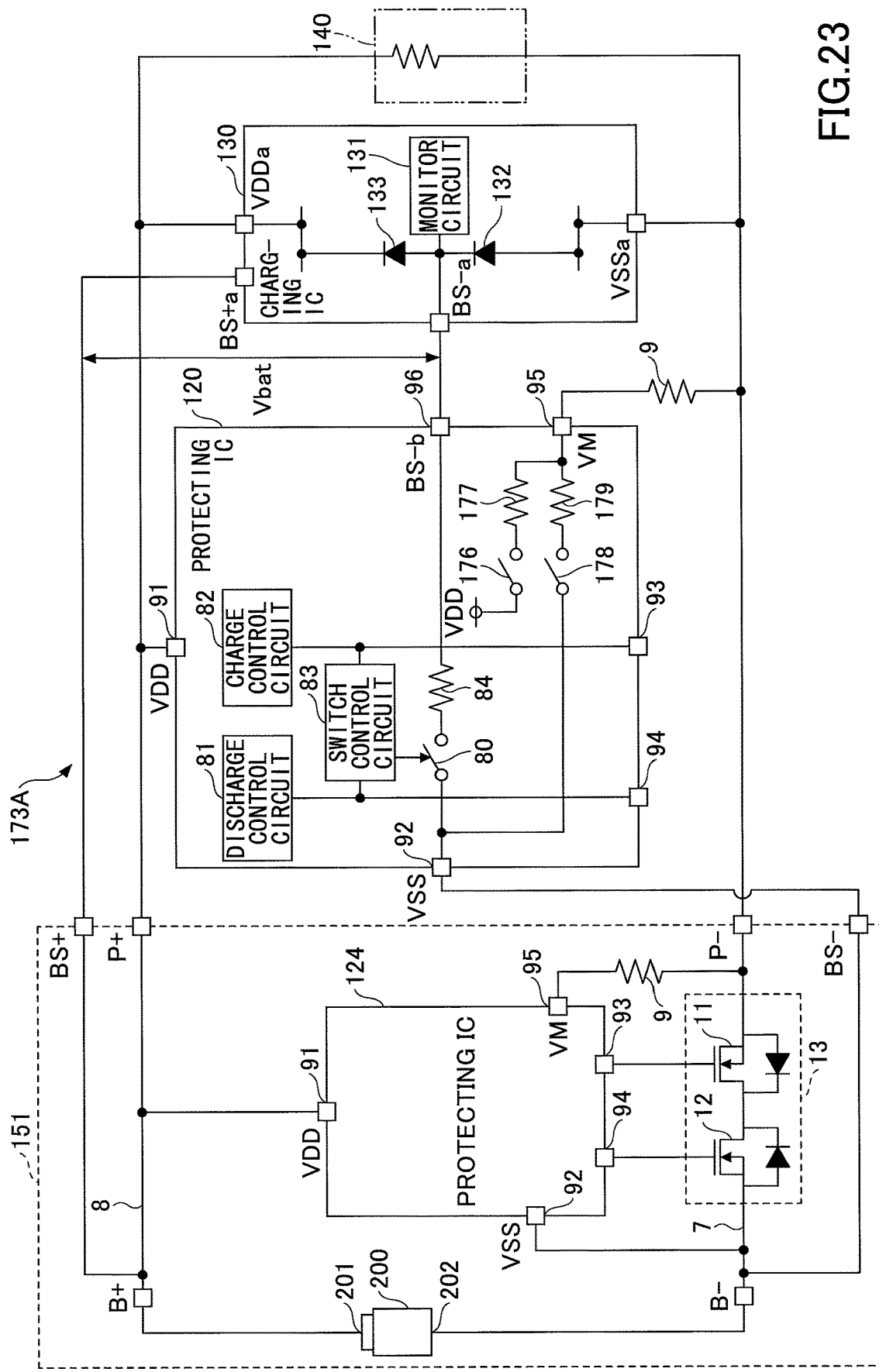
FIG. 23 is a diagram illustrating an example of a configuration of a charge control circuit according to a tenth embodiment.

FIG. 23 is a diagram illustrating an example of a configuration of a charge control circuit 173A according to a tenth embodiment. In the description of the tenth embodiment, configurations and effects equivalent to those of the above described embodiment(s) are omitted or simplified appropriately by incorporating the above description.

According to the tenth embodiment illustrated in FIG. 23, a secondary battery protecting integrated circuit (the protecting IC 120 illustrated in FIGS. 7 and 8, for example), which includes monitor terminals provided so that electric potentials of electrodes of a secondary battery are monitorable, is used without connecting a charge control transistor and a discharge control transistor. The charge control circuit 173A illustrated in FIG. 23 includes the protecting IC 120 arranged between the battery pack 151 and the charging IC 130. According to the configuration illustrated in FIG. 23, similar to the above described embodiment(s), an electric current path, which go through the internal switch 80, can be shut off by turning off the internal switch 80.

Eleventh Embodiment

Figure 24:
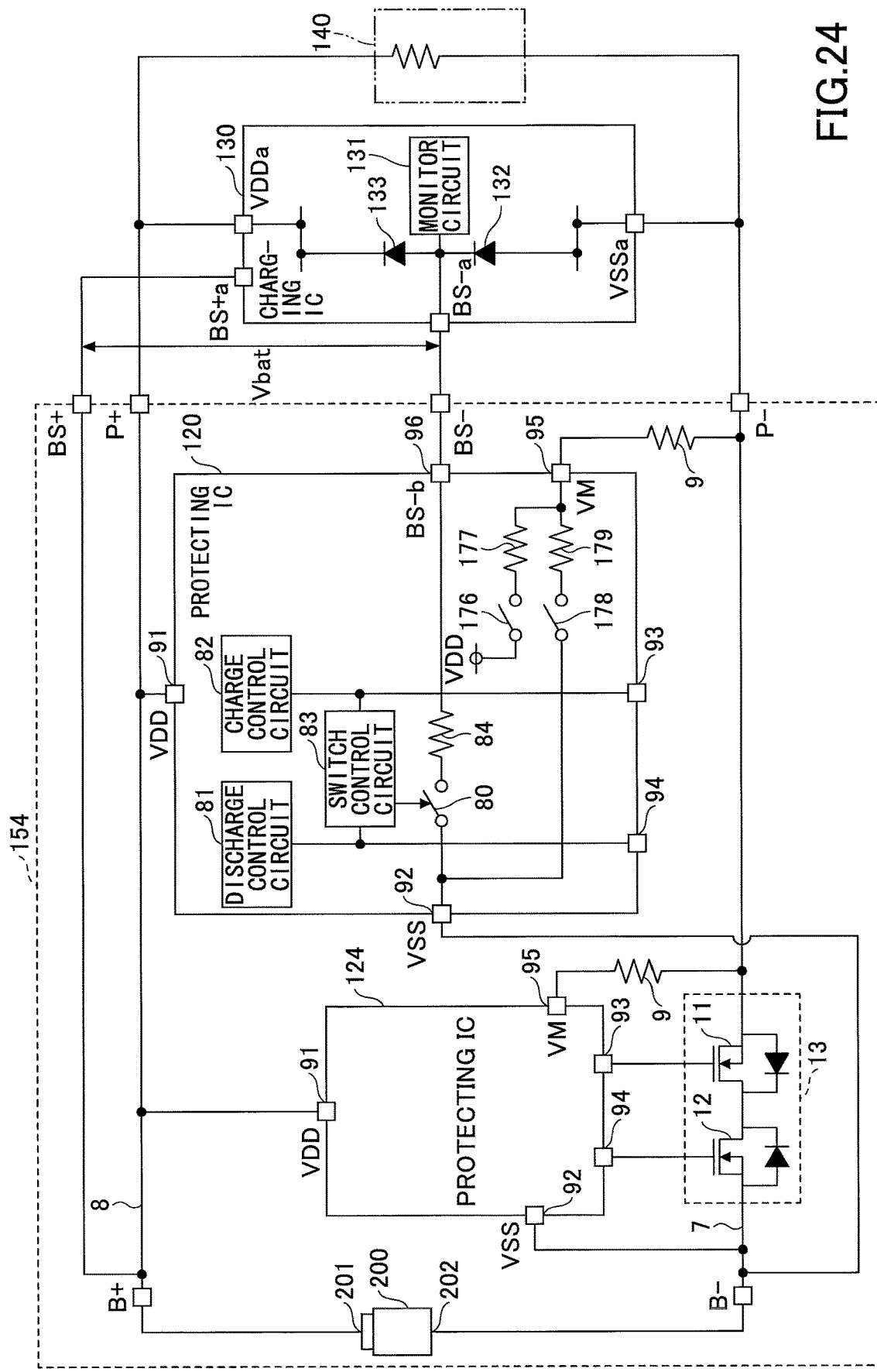
FIG. 24 is a diagram illustrating an example of a configuration of a battery pack according to an eleventh embodiment.

FIG. 24 is a diagram illustrating an example of a configuration of a battery pack 154 according to an eleventh embodiment. In the description of the eleventh embodiment, configurations and effects equivalent to those of the above described embodiment(s) are omitted or simplified appropriately by incorporating the above description.

According to the tenth embodiment illustrated in FIG. 23, the protecting IC 120 is arranged outside the battery pack 153. On the other hand, according to the eleventh embodiment illustrated in FIG. 24, the protecting IC 120 is arranged inside of the battery pack 154. According to the eleventh, similar to the tenth embodiment, an electric current path, which go through the internal switch 80, can be shut off by turning off the internal switch 80.

Although the secondary battery protecting integrated circuit, the secondary battery protecting circuit, the charge control circuit, and the battery pack have been described above with reference to the embodiments, the present invention is not limited to the above described embodiments. It should be understood that the various changes, substitutions, and alterations could be made hereto without departing from the spirit and scope of the invention. Further, all or part of the components of the embodiments described above may be be combined.

For example, in FIGS. 7, 15, 16, and 19 to 24, the charging IC 130 may detect the battery voltage Vcell by monitoring the terminal voltage Vbat between the terminal P+ and the terminal BS− rather than monitoring the terminal voltage Vbat between the terminal BS+ and the terminal BS−. In this case, the terminal BS− is an example of a first monitor terminal, and the terminal P+ is an example of a second monitor terminal. In this case, although a voltage drop due to a charging/discharging current flowing in the electric current path connected to the terminal P+ and in the terminal P+ is generated slightly, the battery voltage Vcell can be accurately detected.

Similarly, for example, in FIGS. 17 and 18, the charging IC 130 may detect the battery voltage Vcell by monitoring the terminal voltage Vbat between the terminal P− and the terminal BS+ rather than monitoring the terminal voltage Vbat between the terminal BS+ and the terminal BS−. In this case, the terminal BS+ is an example of a first monitor terminal, and the terminal P− is an example of a second monitor terminal. In this case, although a voltage drop due to a charging/discharging current flowing in the electric current path connected to the terminal P− and in the terminal P− is generated slightly, the battery voltage Vcell can be accurately detected.

Further, for example, the arranged position of the charge control transistor and the arranged position of the discharge control transistor may be replaced with each other with respect to the illustrated positions. Further, the switch circuit may be built in the protecting IC. Further, the charging IC 130 may be mounted on the substrate 110.

What is claimed is:

1. A secondary battery protecting integrated circuit for protecting a secondary battery by controlling a switch circuit inserted in series on a path that is connected to a first electrode of the secondary battery, the secondary battery protecting integrated circuit comprising:
   a sense terminal connected to a monitor terminal and configured to output a first electric potential of the first electrode so that the first electric potential is monitorable;
   a first power supply terminal connected to the path between the first electrode and the switch circuit;
   a second power supply terminal connected to a second electrode of the secondary battery;
   an internal wiring line configured to connect the first power supply terminal and the sense terminal;
   an internal switch inserted in series on the internal wiring line;
   an abnormality detecting circuit configured to detect a predetermined abnormality; and
   a switch control circuit configured to turn on the internal switch when the predetermined abnormality is not detected by the abnormality detecting circuit, and configured to turn off the internal switch when the predetermined abnormality, due to an electric potential lower than an electric potential of a negative terminal connected to a negative side power supply of a charger or a load being input from the first electrode of the secondary battery via the switch circuit to the abnormality detecting circuit, is detected by the abnormality detecting circuit,
   wherein an electric current that flows through the monitor terminal for monitoring the first electric potential of the first electrode is small in comparison with a charging/discharging current of the secondary battery, and
   wherein the switch control circuit turns off the internal switch when a voltage abnormality of the sense terminal is detected by the abnormality detecting circuit.

2. The secondary battery protecting integrated circuit according to claim 1, further comprising:
   a control circuit configured to control the switch circuit based on a detection result of the abnormality detecting circuit when at least one of a charge abnormality and a discharge abnormality of the secondary battery are detected,
   wherein the switch control circuit turns off the internal switch when at least one of the charge abnormality and the discharge abnormality of the secondary battery are detected.

3. The secondary battery protecting integrated circuit according to claim 1, further comprising:
   a discharge control circuit configured to turn off a discharge control transistor, included in the switch circuit, when over discharging of the secondary battery is detected by the abnormality detecting circuit; and
   a charger connection detecting circuit configured to detect connection of the charger for the secondary battery, wherein the switch circuit turns on the internal switch when the over discharging is detected and the connection of the charger is detected.

4. The secondary battery protecting integrated circuit according to claim 1, wherein the electric current that flows through the monitor terminal for monitoring the first electric potential is not affected by a voltage drop due to resistance of the switch circuit.

5. A secondary battery protecting circuit for protecting a secondary battery by controlling a switch circuit inserted in series on a path that is connected to a first electrode of the secondary battery, the secondary battery protecting circuit comprising:
   a terminal connected to a monitor terminal and configured to output a first electric potential of the first electrode so that the first electric potential is monitorable;
   a wiring line configured to connect the terminal and the path between the first electrode and the switch circuit;
   a switch inserted in series on the wiring line;
   an abnormality detecting circuit configured to detect a predetermined abnormality; and
   a switch control circuit configured to turn on the switch when the predetermined abnormality is not detected by the abnormality detecting circuit, and configured to turn off the switch when the predetermined abnormality, due to an electric potential lower than an electric potential of a negative terminal connected to a negative side power supply of a charger or a load being input from the first electrode of the secondary battery via the switch circuit to the abnormality detecting circuit, is detected by the abnormality detecting circuit,
   wherein an electric current that flows through the monitor terminal for monitoring the first electric potential of the first electrode is small in comparison with a charging/discharging current of the secondary battery, and
   wherein the switch control circuit turns off the internal switch when a voltage abnormality of the terminal is detected by the abnormality detecting circuit.

6. The secondary battery protecting circuit according to claim 5, wherein the electric current that flows through the monitor terminal for monitoring the first electric potential is not affected by a voltage drop due to resistance of the switch circuit.

* * * * *